United States Patent [19]

Kanzaki

[11] Patent Number: 5,526,290
[45] Date of Patent: Jun. 11, 1996

[54] PACE CALCULATION DEVICES

[75] Inventor: Takashi Kanzaki, Akishima, Japan

[73] Assignee: Casio Computer Co., Ltd., Tokyo, Japan

[21] Appl. No.: 283,038

[22] Filed: Jul. 29, 1994

[30] Foreign Application Priority Data

Aug. 4, 1993 [JP] Japan ..................... 5-213381

[51] Int. Cl.⁶ ........................................ G01P 1/00
[52] U.S. Cl. ........................ 364/565; 364/569; 377/24.2; 482/3; 235/105
[58] Field of Search .................... 364/565, 561, 364/569; 377/24.2, 5, 24; 340/321, 323 R, 309.15; 368/108, 89, 110, 243, 113, 244, 251; 482/3, 74; 968/398; 235/105

[56] References Cited

U.S. PATENT DOCUMENTS

| | | |
|---|---|---|
| 4,285,041 | 8/1981 | Smith . |
| 4,371,945 | 2/1983 | Karr et al. ................... 364/561 |
| 4,387,437 | 6/1983 | Lowrey et al. .................. 364/561 |
| 4,396,904 | 8/1983 | Hanaoka ................. 340/309.15 |
| 4,510,485 | 4/1985 | Tahara ........................ 340/321 |
| 4,649,552 | 3/1987 | Yukawa ...................... 235/105 |
| 5,050,141 | 9/1991 | Thinesen . |
| 5,446,775 | 8/1995 | Wright et al. .................. 371/24.2 |

OTHER PUBLICATIONS

Patent Abstracts of Japan, vol. 3, No. 103 (P–134) Aug. 31, 1979 & JP–A–54 080 785 (Omron Tateisi Electronics Co).

Primary Examiner—James P. Trammell
Attorney, Agent, or Firm—Frishauf, Holtz, Goodman, Langer & Chick

[57] ABSTRACT

A pace calculation device including an oscillator and a frequency divider used for timing purposes, an amplifier and a speaker for generating a signal sound, and a CPU for performing an operation. Times taken for a runner to run any first distance twice each at a different pace to the signal sound are measured. The CPU draws a relation between a pace and a run time on the basis of data on two different paces at each of which the runner ran the first distance and data on the run times taken for the runner to run. A run time taken for the runner to run at any pace any second distance which the runner should run in a target run time is measured. The CPU calculates a pace at which the runner runs the second distance in the target run time on the basis of the relation, data on the pace at which the runner ran the second distance, and the run time taken for that run. The speaker generates a signal sound on the basis of data on the pace calculated by the CPU.

18 Claims, 13 Drawing Sheets

PACE CALCULATION DEVICES

BACKGROUND OF THE INVENTION

1. Field of the Invention

The present invention relates to pace calculation devices which determine a pace at which a person moves, for example, by walking or running.

2. Description of the Related Art

Generally, it is an important element that a runner runs while keeping his pace in a marathon or a long distance (for example, 10 km) running race in athletic sports. A runner participating in such a long distance running race can use a pace maker in his exercise.

The pace maker generates a signal such as a sound at given periods to the runner. The runner is able to run to the signal to keep his own pace.

Conventionally, a wrist watch having the function of generating a signal sound at a given period is known as a pace maker, which can change the period of the generated signal sound so as to match with a pace which the runner desires. When the runner runs, he wears this pace maker on his wrist.

However, the conventional pace maker has only the function of changing the period of generating a signal sound. Therefore, for example, it cannot be used in a manner in which, for example, a target run time taken for a runner to run any distance beforehand is determined and a pace appropriate for run of that distance in accordance with the target run time is set.

In this case, in order to obtain a pace p (for example, the number of steps per minute) at which the runner runs a course of a distance d in a target run time t, data items on the step w of the runner, distance d and target run time t are input to the device and the pace p is then required to be calculated in accordance with the following relation:

$$p = d \div w \div t.$$

Since the conventional pace makers have no such function, they cannot be used in a manner in which a pace appropriate for run of any distance in accordance with the target run time is set, as mentioned above.

Even if a pace maker is provided which is capable of obtaining a pace p by calculation such as is mentioned above, the number of data items to be set is large and the operation for keying in those data items is troublesome.

Some data items to set are unclear unless they are measured beforehand; for example, a distance a runner's step. Those data items are troublesome to prepare. If the prepared data items are inaccurate, a pace to be obtained would involve an error, disadvantageously. When the runner runs a course of an unclear distance, necessary data cannot be obtained so that the pace cannot be calculated and such function cannot be used at all.

SUMMARY OF THE INVENTION

It is therefore an object of the present invention to provide a pace calculation device for calculating a pace (the number of steps per given time) at which a person moves through any distance by running or walking in accordance with a target movement time.

It is another object of the present invention to provide a pace calculation device for calculating a pace at which a person moves in accordance with a target movement time even in a course of an unclear distance without setting distance data.

It is still another object of the present invention to provide a pace calculation device convenient to use anywhere without requiring to set data difficult to recognize accurately such as data on the distance of a course which a person moves and his step at which he moves, and capable of obtaining a pace at which the person moves through any distance in accordance with an accurate target movement time.

It is a further object of the present invention to provide a pace calculation device capable of calculating a pace at which the person moves through any distance in accordance with a target movement time by a simple input operation.

In order to achieve the above objects, the present invention provides a pace calculation device comprising:

first storage means for storing data on a plurality of different paces at each of which a person moves through any first distance and data on a like number of different times each taken for the person to move through the first distance at a respective one of the paces;

second storage means for storing data on any pace at which the person moved through any second distance and data on a time taken for the person to move through the second distance;

third storage means for storing data on a target movement time taken for the person to move through the second distance at any pace; and calculating means for calculating a pace at which the person moves through the second distance in the target movement time, based on data on which is stored in the third storage means, on the basis of the data on a plurality of paces and the data on a like number of movement times stored in first storage means, and the data on the pace and data on the movement time stored in the second storage means.

According to the inventive device having the above structure, data on a plurality of paces at each of which the person moves through the first distance (for example, of a test course through which the person moves for setting necessary data) and data on the corresponding plurality of movement times each taken for the movement are stored. The calculating means calculates a pace at which the person moves through the second distance (for example, of a real course which the person desires to run for exercising purposes) in the target movement time even when the step of the runner and the distance of the course are not set. Since no data on the accurate distance of a course which is difficult to recognize numerically in many cases is required, the device is easy to use and to calculate an accurate pace. This device is usable even when the distance of the course is unknown, and is not limited in use to a course of a known distance.

In order to achieve the above objects, the present invention provides a pace calculation device comprising:

first input means for inputting to the device data on a plurality of different paces at each of which a person moves through any first distance and data on a pace at which the person moves through any second distance;

second inputting means for inputting to the device data on a target movement time in which the person moves through the second distance at any pace;

timekeeping means for measuring movement times taken for the person to move through the first and second distances on the basis of the data on the respective paces inputted by the first inputting means to provide data on the movement times;

storage means for storing the data on a plurality of paces inputted by the first inputting means, the data on a target movement time inputted by the second inputting means, the data on the movement times provided by the timekeeping means;

calculating means for drawing a relation between a pace and a movement time on the basis of the data on the movement times and the data on the paces for the movement of the person through the first distance, and calculating from the relation a pace at which the person moves through the second distance in the target movement time, based on data on which is inputted by the second input means; and sounding means for generating a signal sound corresponding to the pace calculated by calculating means.

In the inventive calculation device having such structure, the input means input data on paces in the first distance (for example, of a test course) and data on a pace in the second distance (for example, in a real course) and data on a target movement time for the second distance. The timekeeping means measures the times taken for the person to move through the first and second distances. The storage means stores those data on the measured times. The calculating means obtains the relation between the pace and movement time, and data on the pace in the target movement time on the basis of the relation and the data on a target movement time inputted by the input means and stored in the storage means.

Thus, even when the distance of a course which the person moves in the target movement time is unknown, data on a pace at which the person moves in the target time is easily obtained, and the inventive device is usable in any place where the user desires. The inventive device eliminates the need for setting data, troublesome to deal with, such as data on the distance of a course and the person's step, so that it can easily be used by anybody to provide data on an accurate pace for the person.

In order to achieve the above objects, the present invention provides a pace calculation device comprising:

pedometer means for detecting the number of steps taken for a person to move through any first distance at each of a plurality of different paces and the number of steps taken for the person to move through any second distance at any pace;

timekeeping means for measuring the times taken for the person to move through the respective first and second distances when the respective numbers of steps are detected by said pedometer means;

input means for inputting to the device data on a target movement time taken for the person to move through the second distance;

first calculating means for calculating a plurality of paces at each of which the person moved through the first distance and a pace at which the person moved through the second distance on the basis of data on the numbers of steps obtained from said pedometer means and data on the movement times obtained from the timekeeping means;

storage means for storing data on the plurality of paces obtained from the first calculating means, data on the target movement time inputted by the input means, and data on the plurality of movement times obtained from the timekeeping means;

second calculating means for drawing a relation between a pace and a movement time on the basis of data on the plurality of paces and data on the plurality of movement times taken for the person to move through the first distance stored in said storage means, and calculating from the relation a pace at which the person moves through the second distance in the target movement time, based on data on which is input by said second input means; and sounding means for generating a signal sound in correspondence to the pace calculated by the second calculating means.

In the inventive calculation device having such structure, the number-of-steps detecting means detects the numbers of steps taken for the person to move through any first distance (for example, of a test course) and any second distance (for example, of a real course). The timekeeping means measures the times taken for the person to move through those distances. The first calculating means calculates data on paces on the basis of those data items on the numbers of steps and the times taken for the person to move through the first and second distances. The storage means stores data on the paces calculated by the first calculating means and data on the target movement times inputted by the input means. The second calculating means obtains a relation between a pace and a movement time, and obtains data on a pace for the person to move through the second distance in the target movement time on the basis of data on the target movement time stored in the storage means.

Thus, even when the distance of a course through which the person moves in the target movement time is unknown, data on a pace at which the person moves in the target movement time is obtained easily. The inventive device is usable in any place where the person desires to use it and eliminates the need for setting data troublesome to deal with, such as data on the distance of a course and the runner's step, so that the inventive device is easily usable to provide data on an accurate pace.

Since the first calculating means calculates a pace on the basis of the numbers of steps detected by the number-of-steps detecting means and the times taken for the movement is measured by the timekeeping means, no data on the pace is required to be input and set. Thus, the inventive device is simple to operate and very convenient to use.

DETAILED DESCRIPTION OF THE PREFERRED EMBODIMENTS

First Embodiment

A first embodiment of a pace calculation device according to the present invention will be described below. The pace calculation device of this embodiment is incorporated into an electronic wrist watch and has the function of calculating a pace as well as displaying the time as a wrist watch.

Figure 1:
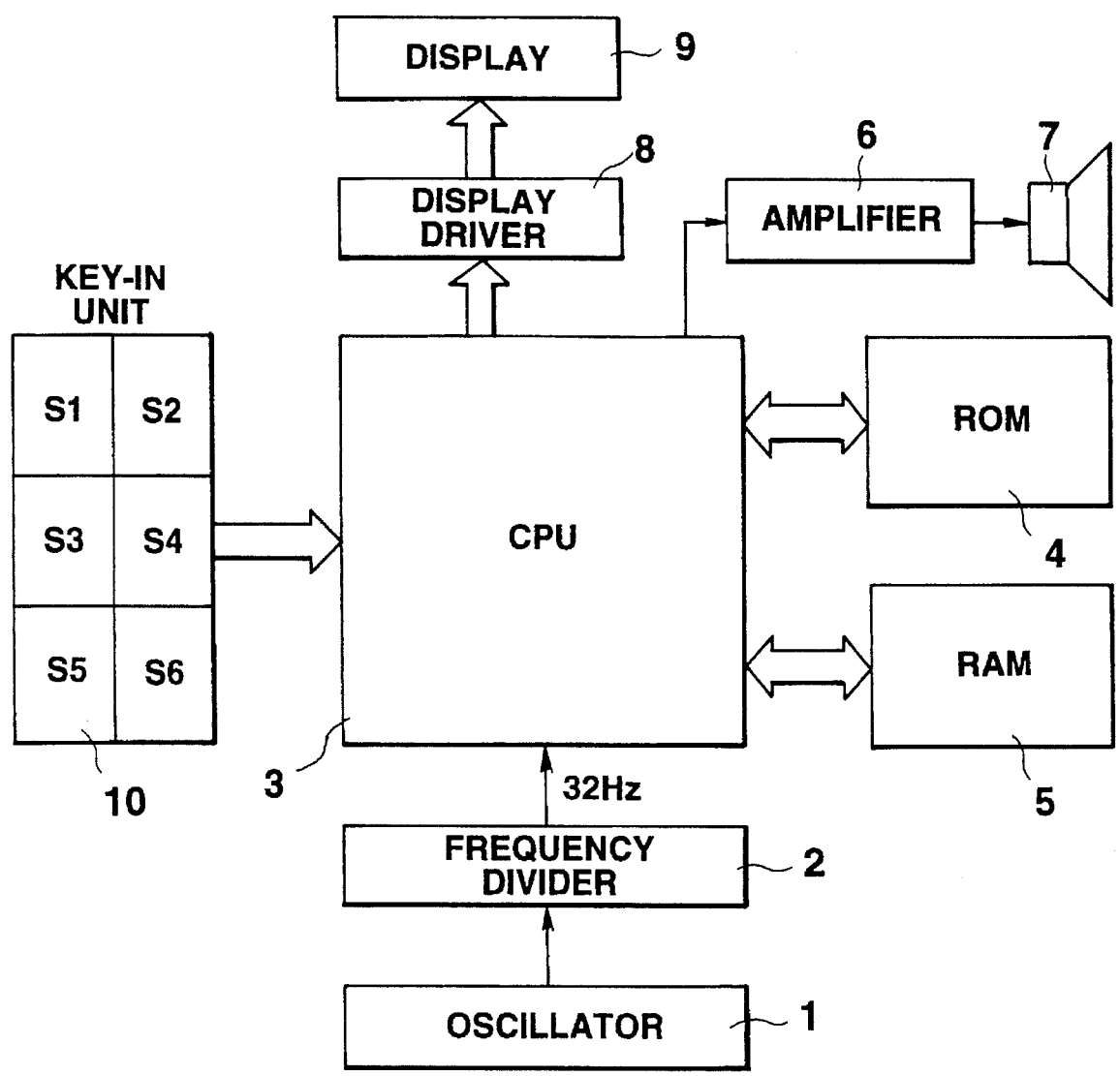
FIG. 1 is a block diagram indicative of the basic structure of a first embodiment of a pace calculation device according to the present invention.

FIG. 1 is a block diagram indicative of the basic structure of the pace calculation device of the first embodiment. As shown in FIG. 1, the pace calculation device includes an oscillator 1 and a frequency divider 2 which cooperate to output a pulse signal of a predetermined period; a central processing unit (CPU) 3 which records the current time, measures elapsed time and calculates a pace (to be described later) on the basis of a pulse signal from the divider 2; a read only memory (ROM) 4 which stores a program for controlling the operation of the CPU 3; a random access memory (RAM) 5 which stores data; an amplifier 6 and a speaker 7 which cooperate to amplify a pace signal from the CPU 3 and output as a signal sound; a display driver 8 and a display 9 which cooperate to display the time, pace and elapsed time; and a key-in unit 10 which keys in data and changes a mode, as will be described later.

The oscillator 1 uses a well-known crystal resonator which generates a signal of a frequency, for example, of 32,768 Hz, depending on an oscillatory frequency inherent in the resonator.

The frequency divider 2 divides a signal from the oscillator 1 to obtain a signal of a reduced frequency and, in this embodiment, a signal of 32 Hz, which is then fed to the CPU 3.

Figure 2:
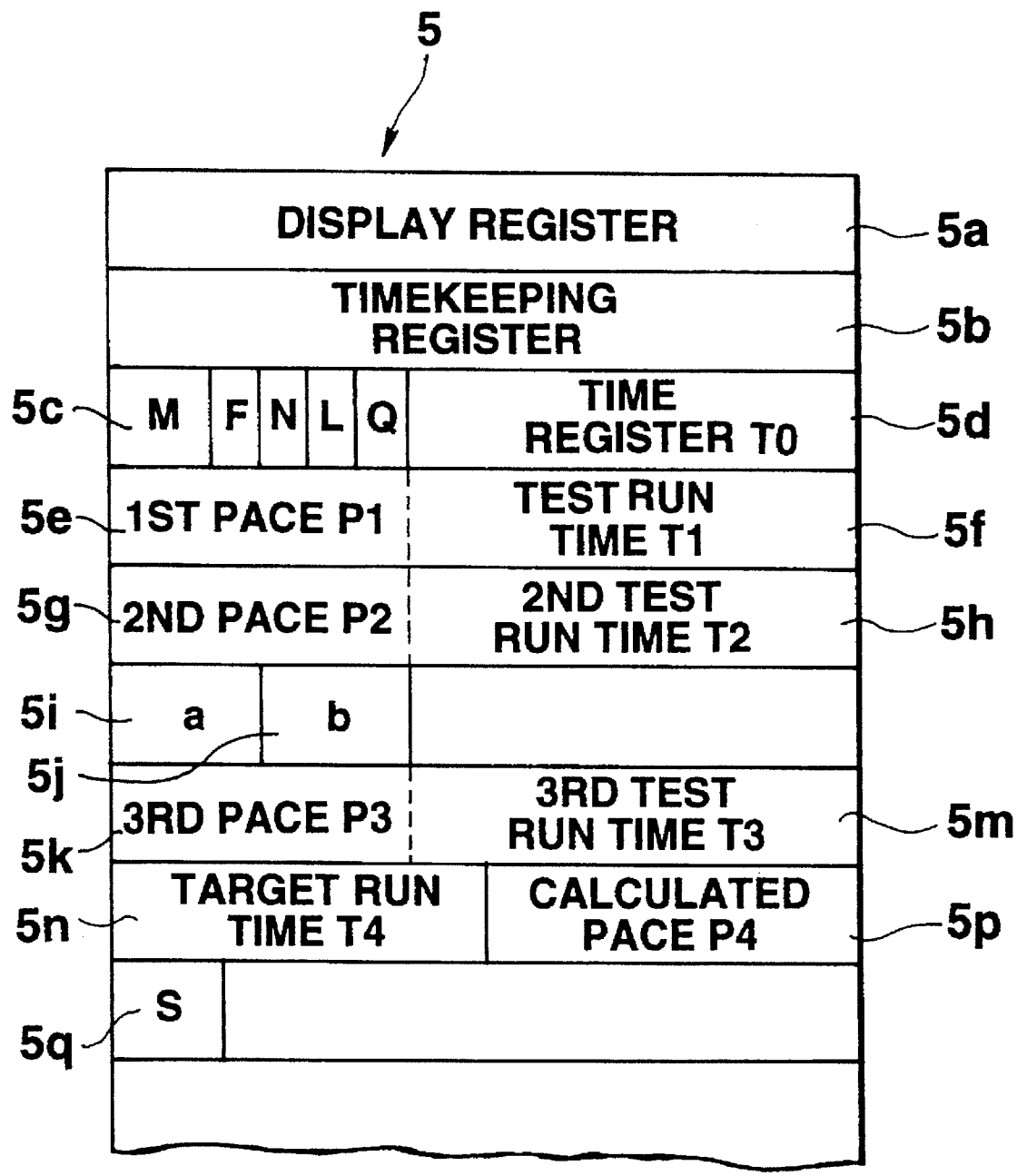
FIG. 2 shows the structure of a memory area of the pace calculation device of the first embodiment.

As shown in FIG. 2, the RAM 5 includes a display register area 5a which stores data to be displayed on the display 9; a timekeeping register area 5b which stores data on elapsed time corresponding to a signal received from the divider 2; an area 5c which stores displayed mode changing flags M, F, N, L and Q (described later); and a time register T0 area 5d which stores data on a time measured by a stopwatch.

The RAM 5 includes a first test run pace data P1 area 5e which stores data on a runner pace P1 in a first test run to be described; a first test run time T1 area 5f which stores data on a time T1 taken in the first test run; a second test run pace P2 area 5g which stores data on a runner pace P2 in a second test run to be described later; a second test run time T2 area 5h which stores data on a time T2 taken in the second test run.

In the present embodiment, the pace is meant by the number of runner steps per given time, more particularly, minute, taken when the runner ran. The test run time is meant by a time taken for the runner to run (or move through) a test distance.

In a pace-test run time relation to be described in more detail later, the RAM 5 includes an area 5i which stores a coefficient a; an area 5j which stores a constant b; a third test run pace P3 area 5k which stores data on a pace P3 had in the third test run; a third test run time T3 area 5m which stores data on a test time T3 taken in the third test run; a target run time T4 area 5n which stores data on a target run time T4 aimed at when he runs any distance and keyed in by the key-in unit 10; an area 5p which stores data on a pace P4 calculated by the CPU 3 and at which pace the runner runs in the target run time; and an area 5q which stores data on a flag S indicative of the start to stop of a stopwatch function to measure the first-third test run times.

Figure 3:
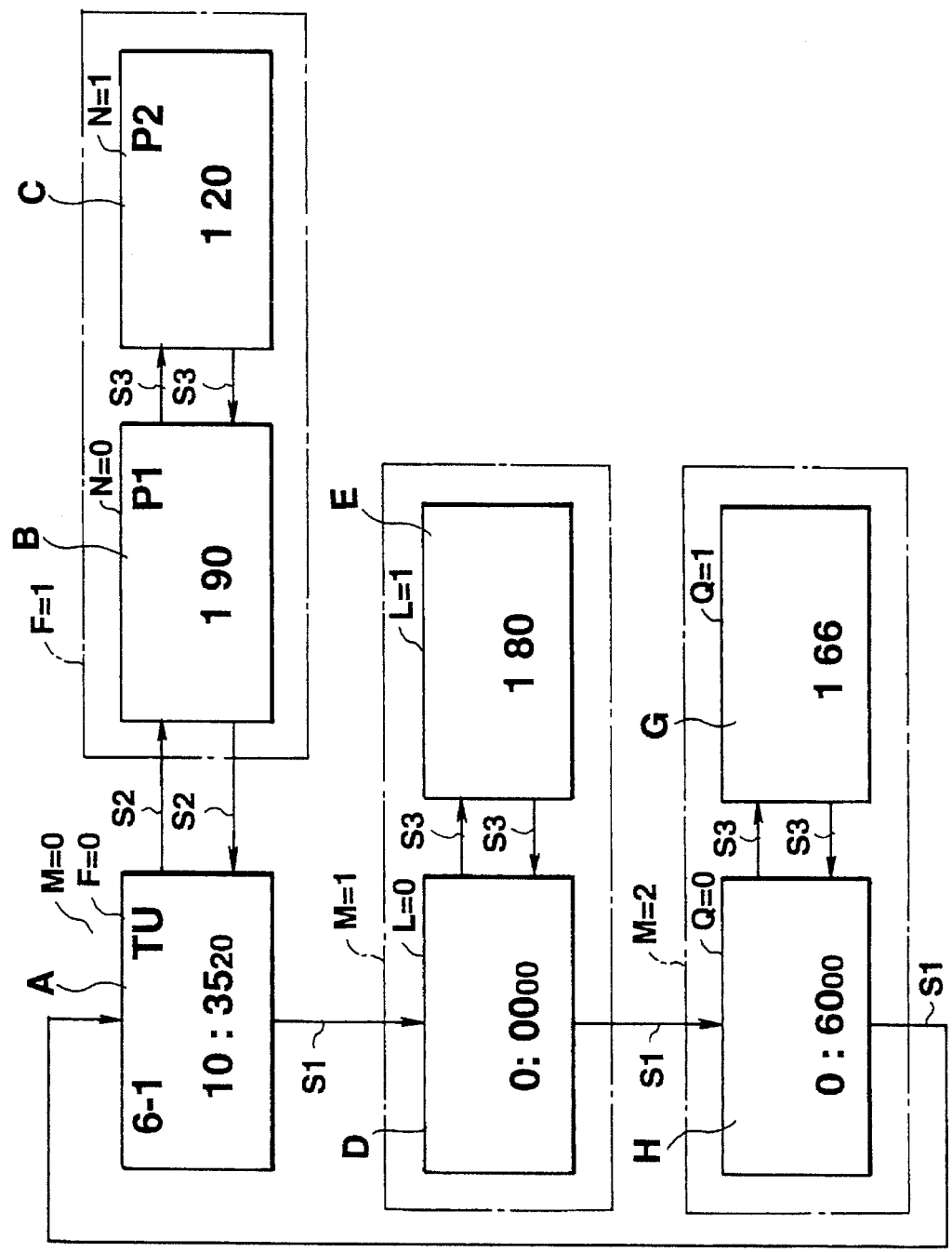
FIG. 3 illustrates a process for changing a mode in the pace calculation device.

The display 9 includes a well-known liquid crystal one which is driven by the display driver 8 which receives data on the time, pace and test run time from the CPU 3 to display the data, as shown in FIG. 3.

As shown in FIG. 3, the pictures displayed on the display 9 include a clock display mode picture A, a first test run mode picture B, a second test run mode picture C, a third test run mode time measuring picture D and a pace setting picture E, and a real mode target run time setting picture H and a pace display picture G.

The key-in unit 10 is composed of first-sixth key switches S1, S2, S3, S4, S5 and S6 each of which outputs a key switch on/off signal with the first-third key switches S1–S3 each being used for changing a mode.

The fourth key switch S4 is used for keying in data on a pace or a target run time numerically. Each time the fourth key switch S4 is depressed to turn on the same, the numerical value input increases. When the numerical value reaches a predetermined one, it is reset to 0, like a key switch used to key in a numerical value in a well-known digital clock.

The fifth key switch S5 is used to start/stop the stopwatch function of the pace calculation device.

The sixth key switch S6 is used to clear data on the time measured by the stopwatch.

The CPU 3 has the functions of displaying the time and measuring the elapsed time on the basis of a signal from the frequency divider 2; processing a signal from the key-in unit 10; and calculating a pace at which the runner runs any distance in a target run time.

Figure 4:
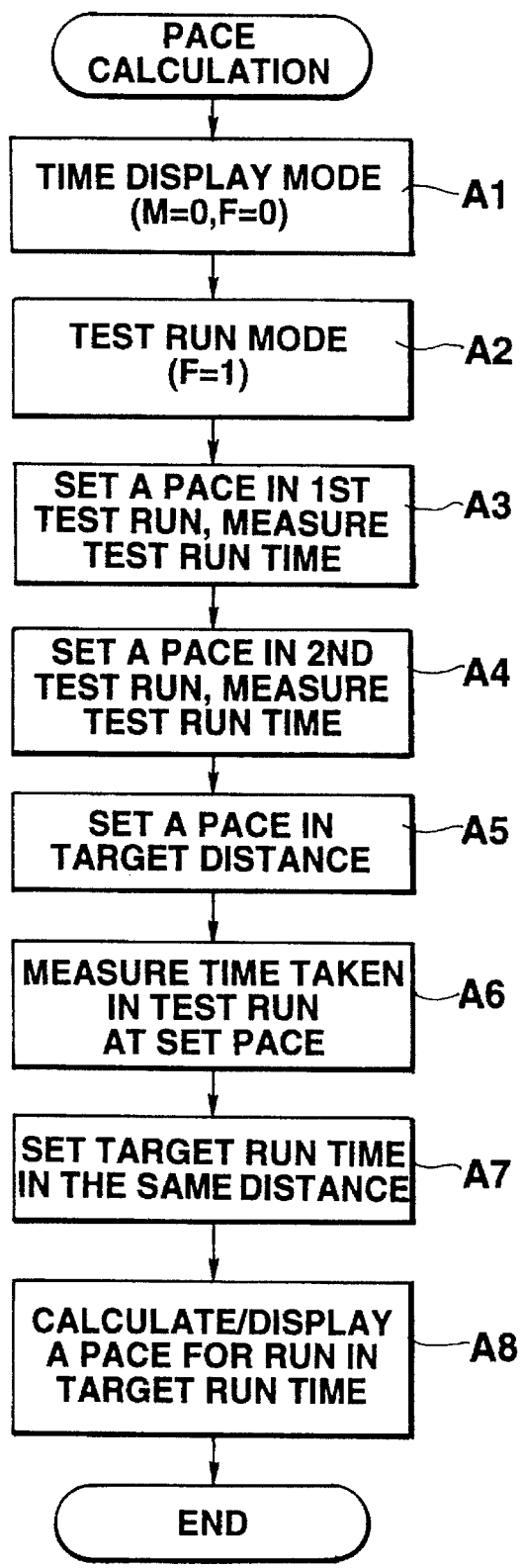
FIG. 4 is a flowchart indicative of a pace calculation method performed by the pace calculation device.

A process for calculation of a pace by the present pace calculation device will be described with respect to FIGS. 3–5.

When the values of the flags M and F are 0, the CPU 3 is in a time display (clock) mode. As shown in the clock mode picture A of FIG. 3, the display 9 displays the current time, date, and day of the week (step A1 of FIG. 4).

When a pace at which the runner runs any distance in the target run time is to be calculated, the value of the flag F is set at 1 by a signal indicative of the turning-on operation of the second key switch S2 at the key-in unit 10 to change the operation of the CPU 3 from that in the clock mode to that in the test run mode (first or second test run mode) at step A2.

In the test run mode, a pace in the first mode test run is set and a test run time in which the runner runs any distance x at the pace is measured (step A3).

The runner keys in pace data by the fourth key switch S4 to set the pace. As shown in the first test run picture B of FIG. 3, the pace is set, for example, at 190 steps/minute. The pace data P1 is stored in the first pace P1 memory area 5e of the RAM 5 of FIG. 2. The CPU 3 outputs a pace signal to the amplifier 6 on the basis of the pace data and the speaker 7 generates a signal sound at periods of 190 steps/minute.

Figure 5:
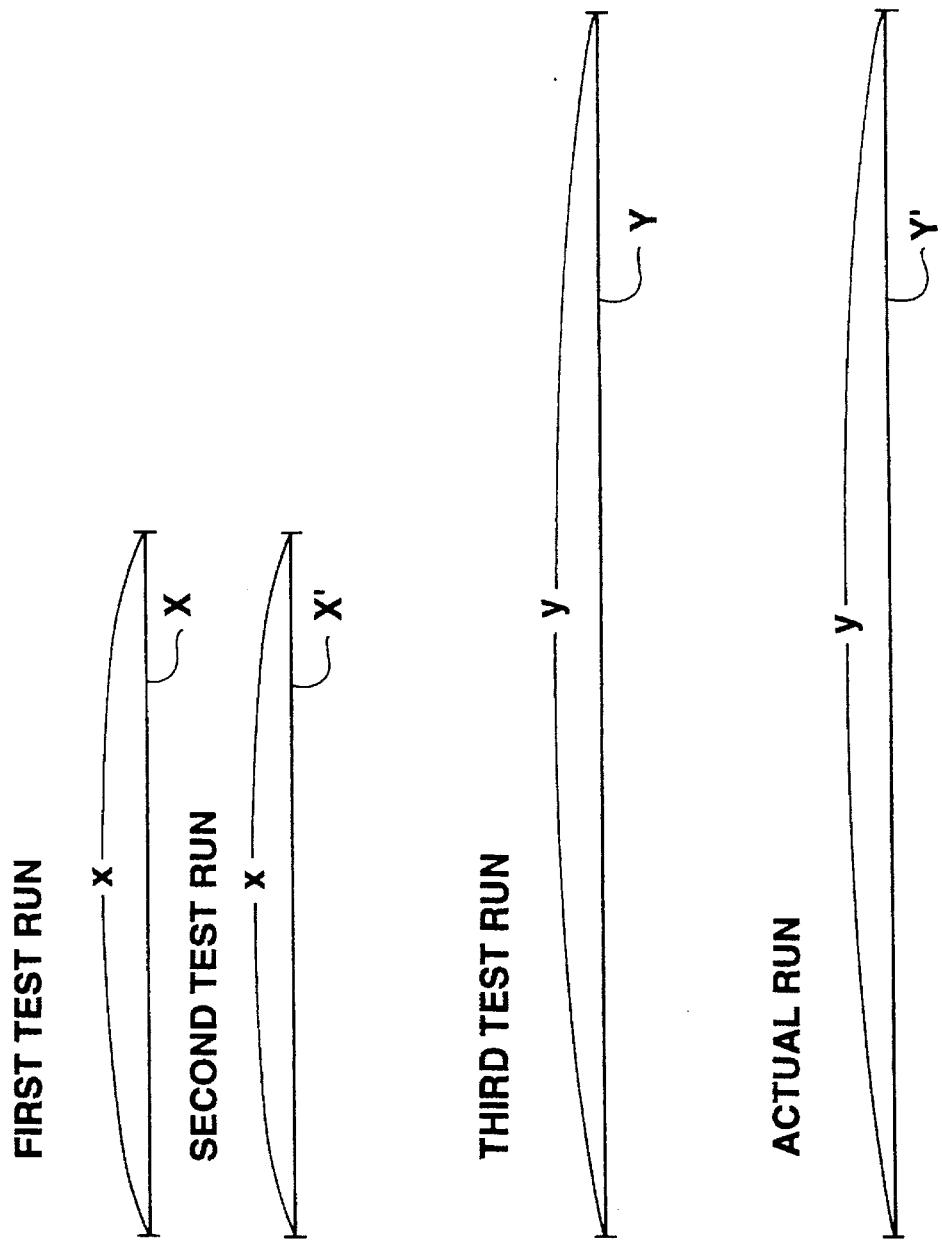
FIG. 5 illustrates a pace calculation method performed by the pace calculation device.

As shown in FIG. 5, the runner runs a course X having any distance x at a pace corresponding to the signal sound. At the start of the course X, the runner depresses the fifth key switch S5 to start the stopwatch function and starts to run the course to the signal sound. The runner then stops the stopwatch function by depression of the fifth key switch S5 again at the end point of the course X to measure the test run time for the course X. The test run time data obtained in this measurement is stored in the first test run time T1 area 5f of the RAM 5. Assume now that the first run time taken is 21 seconds.

By the depression of the third key switch S3 in the test run mode, the runner changes the picture from the first test run picture B of FIG. 3 to the second test run picture C and sets a pace in a second test run and measures the test run time taken for the runner to run any distance x of the course X' are at the set pace as in the first test run (step A4).

Data on the pace set in the second test run is stored in the second pace P2 area 5g of the RAM 5 of FIG. 2 while data on the second test run time taken for this test run is stored in the second test run time T2 area 5h of the RAM 5.

Assume now that the pace set in the second test run was 120 steps/minute and the test run time was 46 seconds.

The test run distance in the second test run is required to be the same distance x as that in the first test run and the runner preferably makes a second test run in the same course X as that in the first test run. The pace set for the second test run is required to be different from the pace in the first test run.

The CPU 3 employs the following as a relation between a pace and test run time taken when the runner runs each of the courses X and X' having a distance x and calculates a coefficient a and a constant b of the relation:

$$P=aT+b$$

where P is the pace and T is the test run time.

The data on the paces set in the first and second test runs and data on the measured test run times are substituted into the pace P and test run time T, respectively, to establish the following simultaneous equations and the coefficient a and b are calculated:

$$190=21a+b$$

$$120=46a+b.$$

The result of solution of the simultaneous equations is a=−2.8 and b=248.8, which are then substituted into the simultaneous equations to thereby bring about the following relation:

$$P=-2.8T+248.8.$$

The coefficient a and constant b of the above relation are stored in the memory areas 5i and 5j, respectively, of the RAM 5. This relation is inherent in the runner who made the first and second test runs.

Next, a third test run is made. A course Y for the third test run is required to have the same distance y as that in the course Y' which the runner should run in a set target run time and is preferably the same course as Y'.

The pace employed in the third test run is set as in the first and second test runs. First, the runner depresses the first key switch S1 and then the third key switch S3 to change the picture to the pace setting picture E in the third test run mode of FIG. 3. The key switch S4 is then depressed to key in a desired pace data value, which is then stored in the third test run pace P3 area 5k of the RAM 5 (step A5).

The runner then depresses the third key switch S3 to change the picture to the third test run mode time measuring picture D. The runner then depresses the fifth key switch S5 to fulfill the stopwatch function to measure the test run time by making a test run in the course Y. The data on the test run time T3 obtained in this measurement is stored in the third test run time T3 area 5m of the RAM 5 (step A6).

In this case, assume that the pace set for the third test run is 180 steps/minute and the test run is 50 seconds.

Substituting "180" of the pace into the relation, $$180=-2.8T+248.8.$$

Thus, $$T=24.57.$$

The test run time taken for the runner to run the distance x at the pace of 180 steps/minute is obtained as 24.57 seconds from the above expression.

The runner then depresses the first key switch S1 to change the picture to the real mode target run time setting picture H and keys in target run time data with the fourth key switch S4. The target run time data is stored in the target run time T4 area 5n of the RAM 5 (step A7).

The runner then depresses the third key switch S3 to change the picture to the real run mode pace display picture G to cause the CPU 3 to calculate the test run time taken for the runner to run the distance x at the target pace from the ratio of the target test run time (60 seconds) to the third test run time (50 seconds):

$$60:50=T:24.57.$$

Thus, $$T=29.484.$$

Since the test run time taken for the runner to run the distance x at the same pace at which the runner runs the distance y in the target run time of 60 seconds has been obtained, the test run time is substituted into the above relation to obtain the pace P as follows:

$$P=-2.8\times29.484+248.8=166.24.$$

The pace P obtained is the one as the runner runs the distance x and which is the same pace at which the runner runs the distance y in the target run time of 60 seconds. Thus, by running the distance y at a similar pace, the target run time of 60 seconds is achieved.

Thus, the pace P=166.24 is a one calculated for the runner to run a course Y' having the distance y in the set target run time and displayed on the pace display picture G of FIG. 3 (step A8).

In order to obtain the calculated pace, it is necessary that the first and second test run distances should be the same and that the third test run distance should be the same as the real run distance in the set real target run time, but no data on the respective course distances is required to be keyed in.

When the calculated pace is obtained, data on the calculated pace is stored in the calculated pace P4 area 5p of the RAM 5. The CPU 3 outputs a pace signal indicative of the calculated pace through the amplifier 6 to the speaker 7, which generates a signal sound indicative of a pace of 166 steps/minute for the runner to run in the target run time of 60 seconds. Thus, the runner is able to run the course Y' to the signal sound to thereby run the course in a time similar to the target run time.

Figure 6:
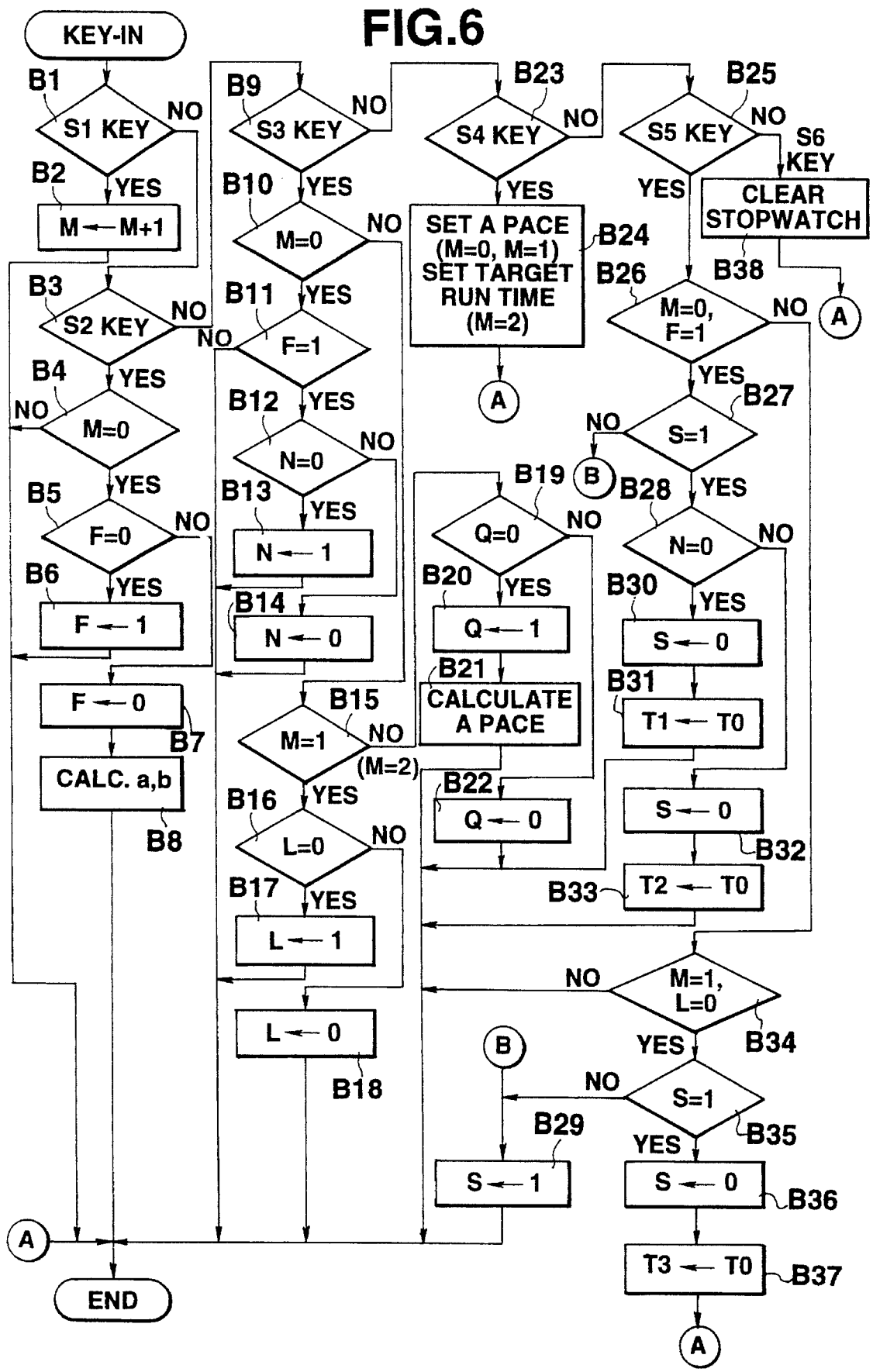
FIG. 6 illustrates a key response process performed in response to the depression of a key in the pace calculation device.
Figure 7:
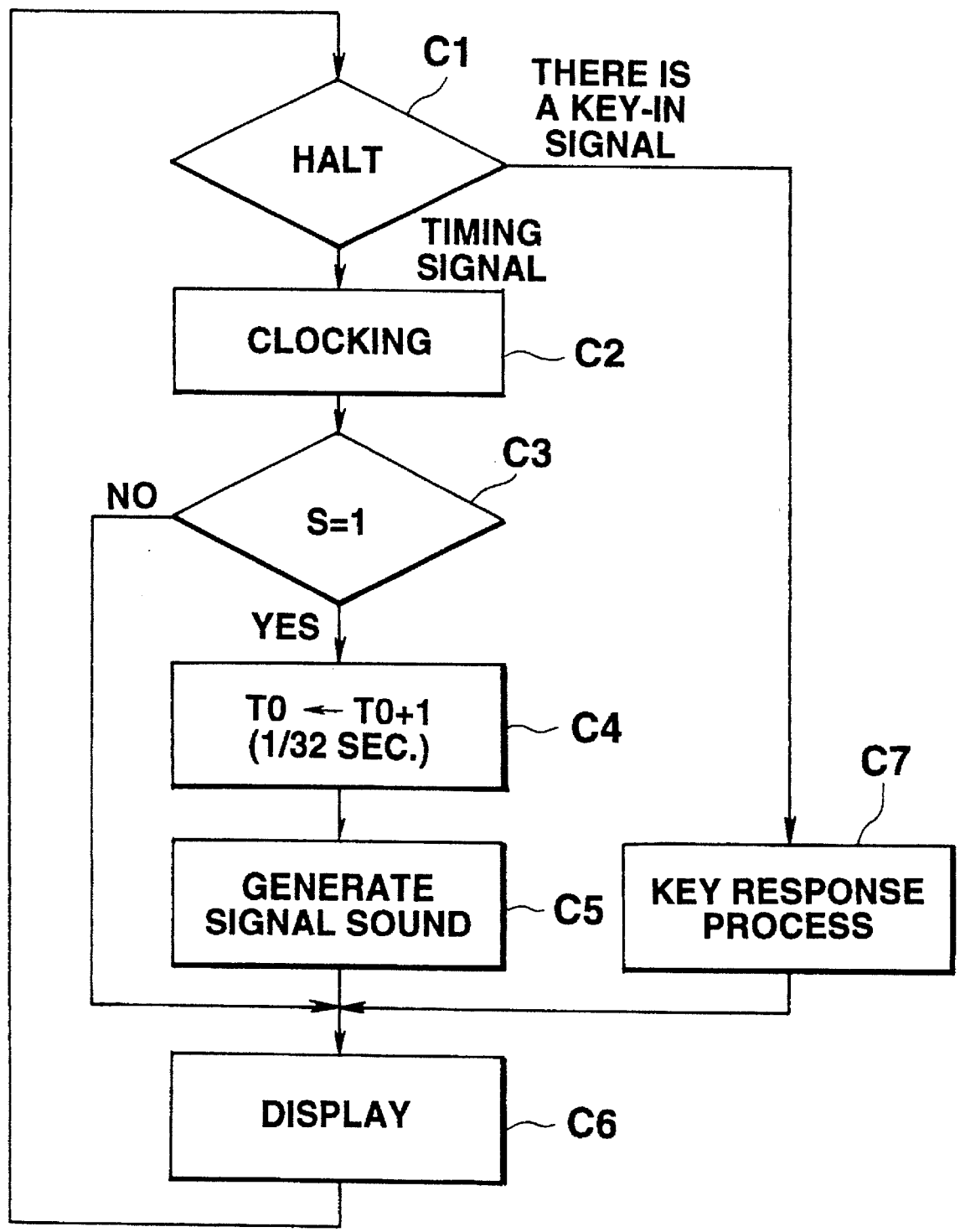
FIG. 7 is a flowchart indicative of an interrupt process performed in response to an interrupt occurring in the pace calculation device.

The operation of the CPU 3 on the basis of the key-in operation at the key-in unit 10, and the mode and display picture changing operations will be described with respect to the flowchart of FIGS. 6 and 7.

First, the flags M, F, N, L, Q which change corresponding modes in response to key-in signals and the stopwatch function flag S will be described.

The flags M, F, N, L, Q each are used for changing the picture of the display 9 and will be described with respect to FIG. 3.

The flag M is used to change the respective clock mode (picture A), first test run mode (picture B) and second test run mode (picture C), third test run mode (pictures D, E) and real run mode (pictures H, G). The respective modes are assigned 0, 1 and 2 as the values of the flag M.

The flag F is used to change the picture from the clock mode (picture A) to the first and second test modes (pictures B, C) and vice versa when the flag M is 0. In the clock mode, F is 0; and in the first and second test run modes (pictures B, C), F=1.

The flag N is used to change the picture from one of the first and second test modes (pictures B and C,) to the other and vice versa when the flag M=0 and the flag F=1. In the first test run mode (picture B), N=0 while in the second test run mode (picture C), N=1.

The flag L changes the picture from the test run time measuring picture D to the pace setting picture E and vice versa when the flag M=1 or in the third test run mode (picture D, E). In the test run time measuring picture D, the flag L=0 while in the pace setting picture E, the flag L=1.

The flag Q changes the picture from the target run time setting picture H to the pace displaying picture G and vice versa when the flag M=2 or in the real run mode (pictures H, G). In the target run time setting picture H, the flag Q=0 while in the pace setting picture G, the flag Q=1.

When each key is depressed, the CPU 3 starts a key response process. First, when the first key switch S1 is depressed (step B1), the CPU adds one to the value of the flag M to terminate the process (step B2). When the flag M is 3, the flag M is set at 0.

When the second key switch S2 is depressed (step B3), the CPU 3 determines whether the value of the flag M is 0 (step B4). When the value of flag M is other than 0, the CPU 3 terminates the process. If the value of the flag M is 0, the CPU 3 determines whether the value of the flag F is 0 (step B5). If so, the CPU 3 sets the flag F at 1 (step B6). When the value of the flag F has already been 1, the CPU 3 returns the value of the flag F to 0 (step B7) and calculates the coefficient a and constant b of the relation P=aT+b by regarding the first and second test runs as completed and hence the two pace data items and corresponding test run time data items as input (step B8).

When the third key switch S3 is depressed (step B9), the CPU 3 determines whether the value of the flag M is 0 (step B10).

If so, the CPU 3 further determines whether the value of the flag F is 1 (step B11). If not, the CPU 3 terminates the process whereas when the value of the flag F is 1, the CPU 3 determines whether the value of the flag N is 0 (step B12). If so, the CPU 3 sets 1 in the flag N to put the picture of the display 9 and the process of the CPU 3 in the second test run mode (step B13). If the value of the flag N is 1, the CPU 3 sets 0 in the flag N to put the picture of the display 9 and the process of the CPU 3 in the first test run mode (step B14).

If the flag M is other than 0, the CPU 3 determines whether the value of the flag M is 1 (step B15). If so, the picture of the display 9 and the process of the CPU 3 are in the third test run mode. Thus, the CPU 3 then determines whether the value of the flag L is 0 (step B16). If so, the CPU 3 sets 1 in the flag L to change the picture of the display 9 and the process of the CPU 3 from the time measuring picture D to the pace setting picture E in the third test run mode (step B17). If the value of the flag L is 1, the CPU 3 sets 0 in the flag L to change the picture of the display 9 and the process of the CPU 3 from the pace setting picture E to the time measuring picture D (step B18).

When the value of the flag M is neither 0 nor 1, or if the value of the flag M is 2, the picture of the display 9 and the process of the CPU 3 are in the real run mode. Thus, the CPU 3 determines whether the value of the flag Q is 0 (step B19). If so, the CPU 3 terminates the third test run process and determines that the third test run pace data and test run time data have been input and that the target run time data has been input. The CPU 3 thus sets 1 in the flag Q and changes the picture of the display 9 and the process of the CPU 3 from the target run time setting picture H to the pace display picture G in the real run mode (step B20), calculates the pace and display it on the display 9 (step B21).

When the value of the flag Q is other than 0, the value of the flag Q is set at 0, and the picture of the display 9 and the process of the CPU 3 are changed from those in the pace calculating mode to those in the target run time inputting mode to terminate the key response process (step B22).

When the fourth key switch S4 is depressed (step B23), a numerical value for setting a pace is keyed in when the picture of the display 9 and the process of the CPU 3 are in any one of the first-third test run modes (M=0 or 1) while a numerical value for setting a target run time is input in the real run mode (M=2)(step B24).

When the fifth key switch S5 is depressed (step B25), the CPU 3 first determines whether the value of the flag M is 0 and the value of the flag F is 1 (step B26). If so, the CPU 3 determines whether the value of the flag S is 1 (step B27) and then whether the value of the flag N is 0 (step B28).

When the value of the flag N is 0, the first test run mode has been employed. Thus, the CPU 3 performs the process in the first test run mode. If the flag S is other than 1, that is, if S is 0, the stopwatch function has been stopped. Thus, the CPU 3 sets 1 in the flag S to start the stopwatch function (to count up the value of the time register T0 of the RAM 5 one by one at intervals of 1/32 seconds in accordance with a signal from the frequency divider 2) and terminates the key response process (step B29).

When the flag S is 1, the stopwatch function has been already operated. Thus, the CPU 3 sets 0 in the flag S to stop the stopwatch function (step B30), and stores the time register T0 data, stored in the memory area 5d of the RAM 5, in the first test run time T1 area 5f of the RAM 5 and terminates the key response process (step B31).

When the flag N is 1, the second test run mode has been employed. Thus, the CPU 3 sets 0 in the flag S (step B32) and performs a process in the second test run mode similar to that in the first test run mode. The data stored in the time register T0 area 5d of the RAM 5 is stored in the second test run time T2 area 5h of the RAM 5 (step B33).

When the value of the flag M is not 0 and the value of the flag F is not 1 either, the CPU 3 determines whether the value of the flag M is 1 and the value of the flag L is 0 (step B34). If the value of the flag M is not 1 and the value of the flag L is not 0, the CPU 3 terminates the process. When the value of the flag M is 1 and the value of the flag L is 0, the CPU 3 determines whether the value of the flag S is 1 (step B35) to perform the process in the third test run mode.

When the value of the flag S is not 1, the CPU 3 sets 1 in the flag S to start the stopwatch function (step B29) to measure a test run time in the third test run. When the value of the flag S is 1, the stopwatch function has been operated. Thus, the CPU 3 sets 0 in the flag S to stop the stopwatch function (step B36), stores time register T0 data, stored in the memory area 5d of the RAM 5, as data on a third run test run time in the third test run time T3 area 5m of the RAM 5 to thereby terminate the key response process (step B37).

When the depressed key is not any of the first-fifth key switches S1–S5, the sixth key switch S6 has been operated. Thus, the time data measured by the stopwatch function is cleared or the data value in the time register T0 of the RAM 5 is reset to 0 to terminate the process (step B38).

First, the whole operation of the pace calculation device of this embodiment having the clock function will be described below with respect to the flowchart of FIG. 7.

First, when timing signals are input from the divider 2 at intervals of 1/32 seconds to the CPU 3 which is in the halt state (step C1), the CPU 3 performs a clocking process which sequentially records the time in a well-known manner (step C2). The CPU 3 then determines whether the flag S indicative of the start/stop of the stopwatch function is 1 (step C3). If so, or when the stopwatch function is in operation, the CPU 3 counts up the time register T0 value by one in response to a signal generated from the frequency divider 2 at an interval of 1/32 seconds (step C4).

A sounding process for generation of a signal sound (step C5) starts. In this process, a signal sound is generated in correspondence to a pace set in the first-third test run modes or calculated in the real run mode. Each time the time indicative of the pace duration has passed, the CPU 3 outputs a pace signal to the amplifier 6, and the speaker 7 hence generates a signal sound corresponding to the pace signal.

A numerical value changed due to a lapse of time and the operation of the stopwatch function is displayed on the display 9 (step C6).

When a signal from the key-in unit 10 is input to the CPU 3 which is in the halt state (step C1), the key-in response operation is performed as an interrupt process and the corresponding mode is displayed on the display 9 (step C7).

According to this pace calculation device, the runner makes a test run at a preset pace to draw a relation inherent in the runner between pace and test run time to calculate a pace corresponding to a target run time.

By making a test run through each of the courses X and X' of the same distance x, the relation is obtained and especially no data on the distance of the courses X and X' is required to be input. The first and second test runs in the same course X do not require the distance of the course X to be known as on a ground for athletic sports and the relation can be obtained for any regular running course.

A runner makes a third test run along a course Y having the same distance as a course Y' which the runner should run in a target run time; a set pace in the third test run is introduced into the relation to obtain a test run time at the set pace in the third test run in the distance x of the first and second test runs; the test run time is multiplied by the ratio of the target run time to the third test run time to calculate a time taken for the runner to run the distance x at a pace at which the runner runs a distance y in the target run time; and data on this time is substituted into the relation to obtain a pace at which the runner runs the distance y in the target run time.

The distance x of the first and second test run courses to obtain the above relation is not required to be the same as the distance y for a run in the target run time. Once the relation is obtained for one runner, a pace at which the runner runs in a target run time in each of a plurality of courses each having a different distance can be calculated by using the relation and causing the runner to make a third test run only once in that course.

Even when a second target run time is set and a corresponding pace is calculated in a course different from that for which the first target run time is set first, no data on the distance of the second course is required to be input.

Thus, according to the pace calculation device of this embodiment, a pace corresponding to a target run time is easily calculated even in a course whose distance is not known. Once the expression is obtained, a pace corresponding to a target run time is more easily calculated in each of a plurality of courses each having a different distance.

Since no data on the distance of a course and the length of a runner step is required to be set, the device is easily used anywhere and a pace is calculated accurately. Thus, pace data is only required to be input in a test run and target run time data is required to be input in a real run, so that the key-in operation is simple and the device is easy to use.

Second Embodiment

A second embodiment of the pace calculation device according to the present invention will be described with reference to the drawings. This pace calculation device is incorporated into an electronic wrist watch like the pace calculation device of the first embodiment.

The pace calculation device of this second embodiment is different from that of the first embodiment in that the former automatically sets a runner pace for the runner at the start of each of first-third test runs whereas the latter sets a runner pace in accordance with data keyed in from the key-in unit 10 in each of the first-third test runs. To this end, the pace calculation device of the second embodiment has the functions of detecting the number of runner steps in the first-third test runs and calculating a runner pace in each of the first-third test runs on the basis of the detected number of steps.

The pace calculation device of the second embodiment is similar to the pace calculation device of the first embodiment in that predetermined data is obtained in the first-third test runs to obtain a relation and a pace is obtained in a real run for which the target time is determined from the relation.

Figure 8:
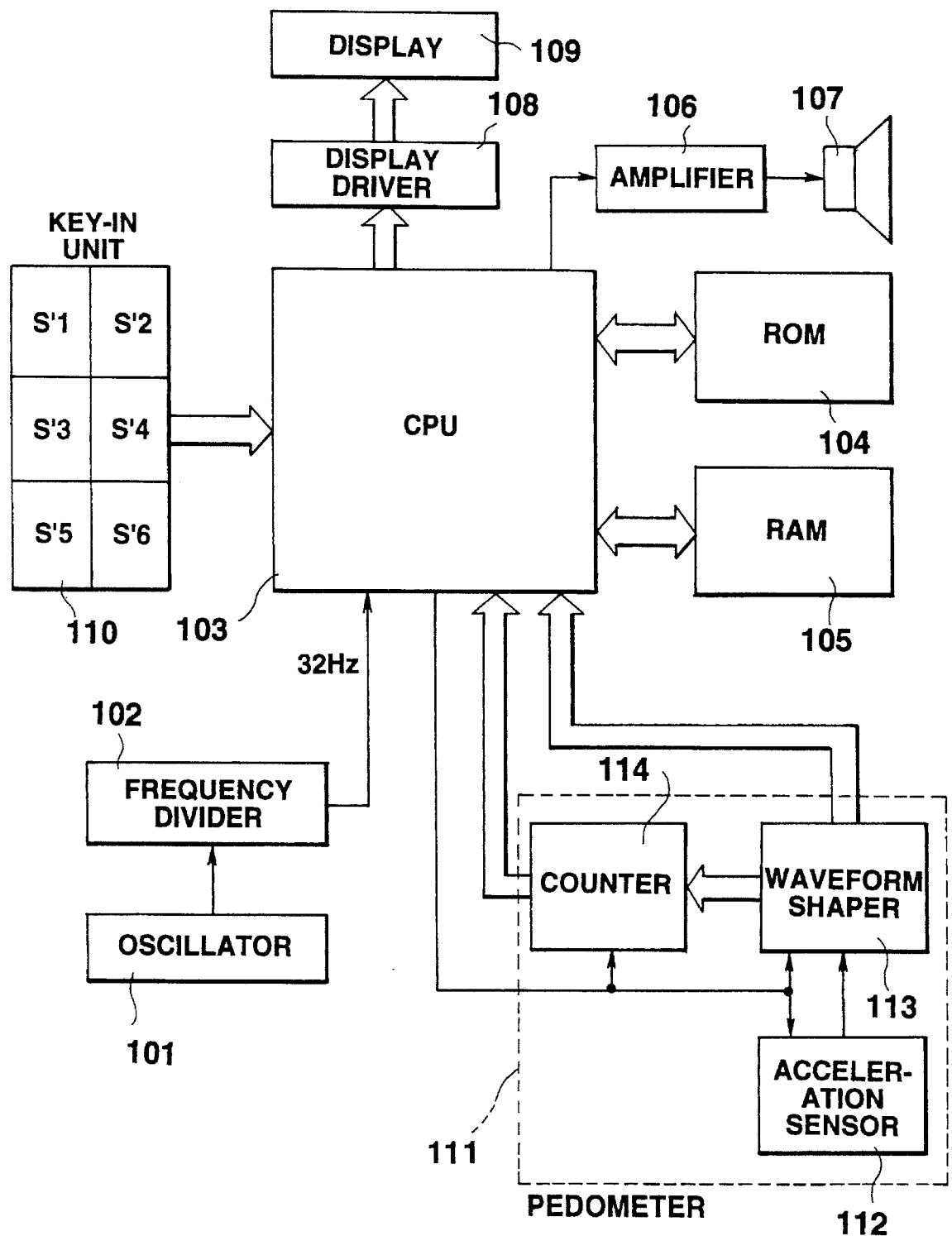
FIG. 8 is a block diagram indicative of the basic structure of a second embodiment of the pace calculation device according to the present invention.

FIG. 8 is a block diagram indicative of the basic structure of the pace calculation device of the second embodiment. In FIG. 8, reference numeral 101 denotes an oscillator; 102, a frequency divider; 103, a CPU; 104, a ROM; 105, a RAM; 106, an amplifier; 107, a speaker; 108, a display driver; 109, a display; 110, a key-in unit; 111, a pedometer. Those elements of the second embodiment are the same in structure as those of the first embodiment except for the pedometer 111.

As shown in FIG. 8, the pedometer 111 is composed of an acceleration sensor 112, a waveform shaper 113 and a counter 114. The acceleration sensor 112 is a well-known one, which is composed, for example, of a plate-like piezoelectric element fixed at one end in a casing and having two leads, one attached to each of the opposite surfaces of the plate-like piezoelectric element. When vibrations due to walking or running are applied to the acceleration sensor 112, the piezoelectric element vibrate in a direction perpendicular to the surfaces thereof to produce pulsating voltages, which are obtained from the leads attached to the opposite surfaces of the elements for sensing purposes.

The waveform shaper 113 shapes the pulsating waveforms obtained from the acceleration sensor 112 to output a square pulse signal. The waveform shaper 113 is composed of a low pass filter, an amplifier and an operational amplifier (not shown). In the waveform shaper 113, high frequency components of a signal from the acceleration sensor 112 are filtered out and the filtered signal is output through the amplifier to the operational amplifier, which outputs an accurate pulse signal corresponding to walking and running to the counter 114.

The counter 114 counts pulse signals from the waveform shaper 113 and outputs the result of the counting to the CPU 103.

During detection of the number of steps in the test run mode, the pulse signal from the waveform shaper 113 is input to the CPU 103, which feeds a pace signal corresponding to the pulse signal to the amplifier 106 such that the speaker 107 outputs a signal sound corresponding to the pulse signal from the waveform shaper 113 or to the number of runner's steps.

Figure 9:
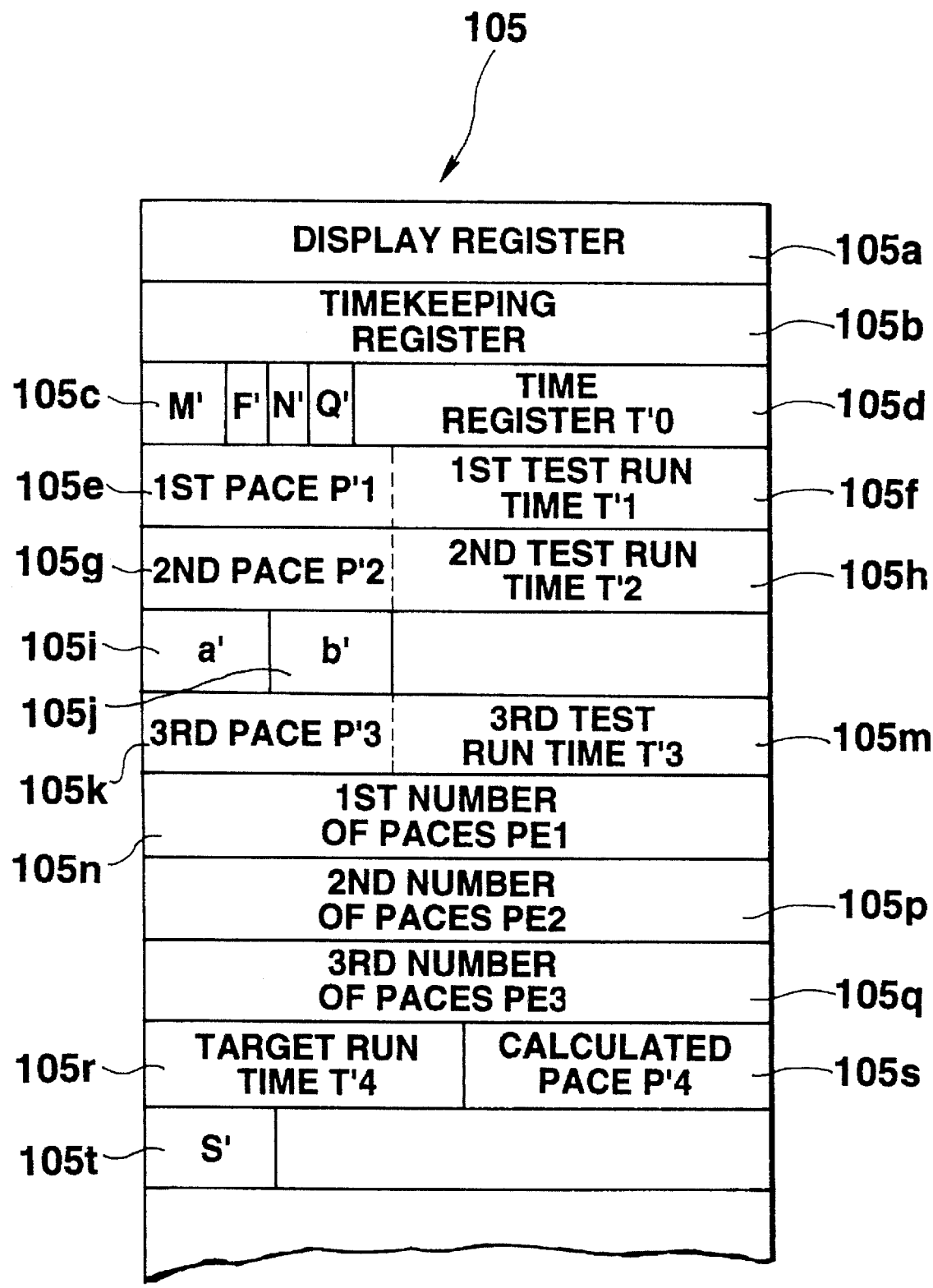
FIG. 9 shows the structure of a memory area in the pace calculation device of the second embodiment.

FIG. 9 shows the structure of the RAM 105. In FIG. 9, reference numeral 105a denotes a display register area which stores data displayed on the display 109; 105b, a timekeeping register area which stores data on lapsed time corresponding to the input signal from the frequency divider 102; 105c, an area which stores display mode changing flags M', F', N', Q' to be described later; 105d, a time register T'0 which stores data on the time measured by a stopwatch function; 105e, a first test run pace P'1 area which stores data on a pace in the first test run; 105f, a first test run time T'1 area which stores data on a test run time taken in the first test run; 105g, a second test run pace P'2 area which stores data on a pace in the second test run; 105h, a second test run time T'2 area which stores data on the test run time taken in the second test run.

In the present embodiment, the pace is meant by the number of runner steps per given time, more particularly, minute, at which the runner runs. The test time is meant by a time taken for the runner to run a test distance.

In the pace-test run time relation to be described later, reference numerals 105i and 105j denote an area which stores a coefficient a' and an area which stores a constant b', respectively; 105k, a third test run pace P'3 area which stores data on a pace in a third test run; and 105m, a third test run time T'3 area which stores data on a test time taken in the third test run.

Reference numerals 105n, 105p and 105q denote first, second and third numbers-of-steps PE1, PE2, and PE3 areas which store corresponding data items on the numbers of steps detected by the pedometer 111 in the first-third test runs, respectively.

Reference numeral 105r denotes a target run time T'4 area which stores data on a target run time keyed in by the key in unit 110; 105s, a calculated pace P'4 area which stores data on a pace calculated by the CPU 103 and at which the runner runs in the target run time; and 105t, an area which stores data on a flag S' indicative of the start to stop of the stopwatch function to measure each of the run times taken in the first-third test runs and of the function of detecting the number of steps taken for the runner to run.

The first test run pace P'1 area 105e, second test run pace P'2 area 105g and test run pace P'3 area 105k store data items on the paces in the first, second and third test runs calculated by the CPU 103 on the basis of data items on the numbers of steps PE1, PE2, PE3 stored in the first, second and third test run numbers-of-steps PE1, PE2 and PE3 areas 105n, 105p and 105q and data items on the first, second and third test run times stored in the first, second and third test run time T'1, T'2 and T'3 areas 105f, 105h and 105m, respectively.

Figure 10:
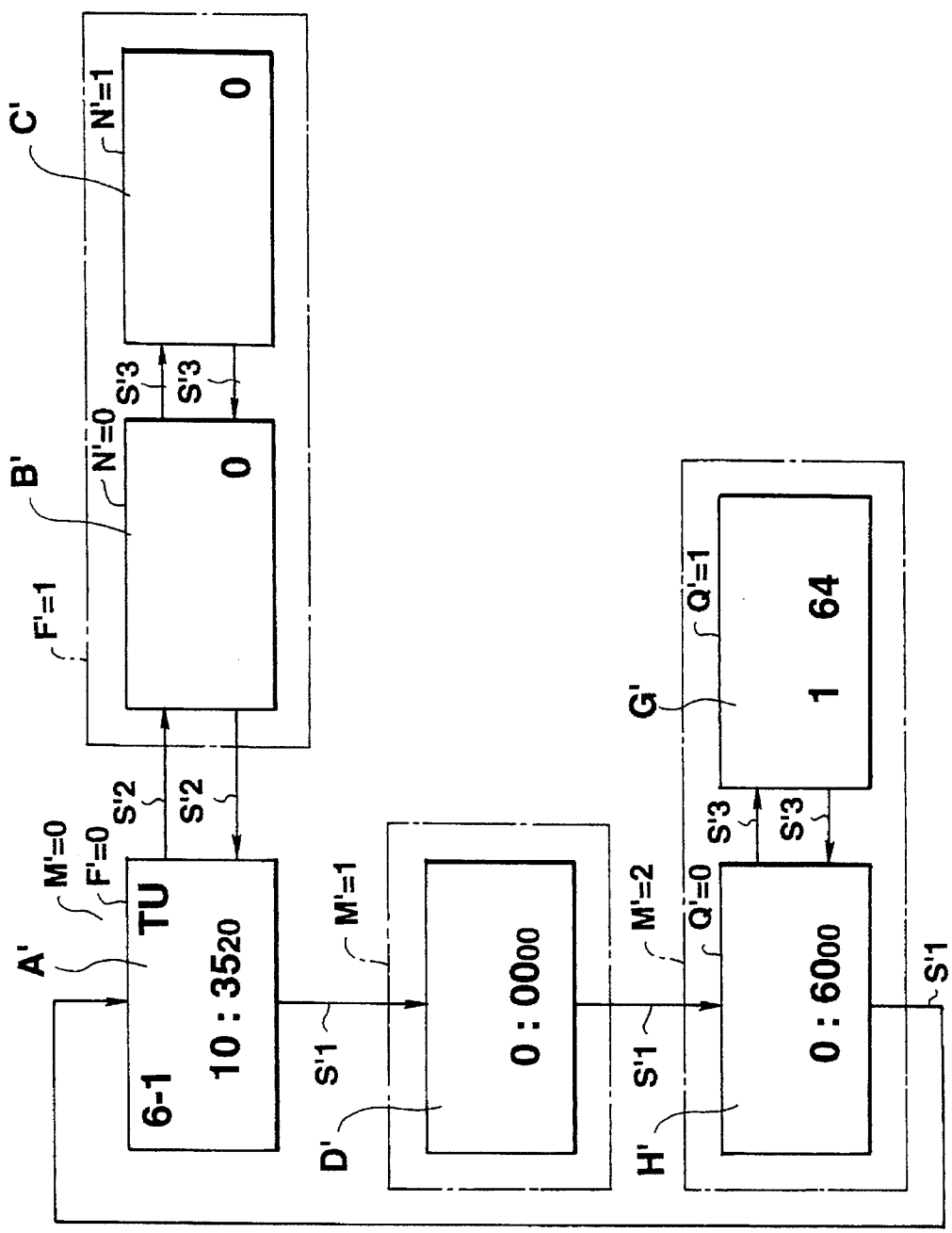
FIG. 10 illustrates a process for changing a mode in the pace calculation device of the second embodiment.

As shown in FIG. 10, the pictures displayed on the display 109 include a clock display mode picture A', a first test run mode picture B', a second test run mode picture C', a third test run mode timekeeping picture D', a real run mode target run time setting picture H' and a pace display picture G'.

The key-in unit 110 is composed of first-sixth key switches S'1, S'2, S'3, S'4, S'5 and S'6 each of which outputs a key switch on/off signal with first-third key switches S'1–S'3 each being used for changing a mode.

The fourth key switch S'4 is used for keying in numerical data on a target run time. Each time the fourth key switch S'4 is depressed to be turned on, the numerical value input increases until the numerical value reaches a predetermined one, whereupon it is reset to 0, like a key switch used to key in a numerical value into a well-known digital clock.

The fifth key switch S'5 is used to start/stop the stopwatch function and pedometer function of the pace calculation device.

The sixth key switch S'6 is used to clear the data measured and detected by the stopwatch function and pedometer function.

The CPU 103 has the functions of recording and measuring the time and elapsed time on the basis of a signal from the frequency divider 102, processing data keyed in from the key-in unit 110, and calculating runner's paces in the first-third test runs and a pace at which the runner runs any distance in a target run time.

Figure 11:
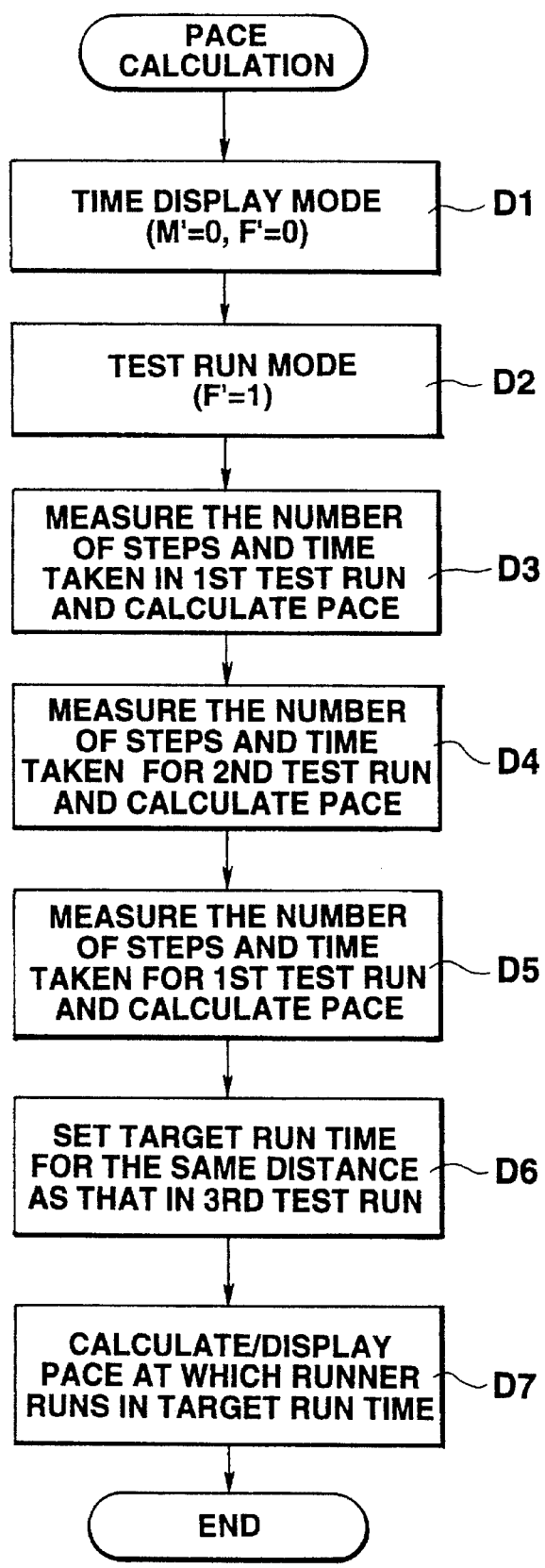
FIG. 11 is a flowchart indicative of a pace calculation method performed by the pace calculation device of the second embodiment.

A process for calculating a pace by the pace calculation device of the second embodiment will be described with respect to the flowchart of FIG. 11 and FIGS. 10 and 5.

When the values of the fags M' and F' are 0, the CPU 103 is in the time display (clock) mode. As shown in the clock mode picture A' of FIG. 10, the display 109 displays the current time, date, and day of the week (step D1 of FIG. 11).

When a pace at which the runner runs any distance in the target run time is to be calculated, the flag F' is set at 1 by an on signal from the second key switch S'2 at the key-in unit 110 to change the process of the CPU 103 from that in the clock mode to that in a test run mode (first and second test run modes) at step D2.

In the test run mode the number of steps taken for the runner to run a course X of any distance x in the first mode test run is detected and a test run time taken for the runner to run that course X at a given pace is measured. A pace for the first test run is calculated on the basis of the detected number of steps and the measured test run time (step D3).

Data on the number of steps counted in the first test run is displayed on the first test run mode number-of-steps detecting picture B' of FIG. 10. Both the number-of-steps detecting function and the stopwatch function are started simultaneously by the depression of the fifth key switch S'5 when the first test run starts. However, the time measured by the stopwatch is not displayed on the display.

When the pedometer function starts, the pedometer 111 generates a voltage waveform depending on the number of steps of the runner and feeds to the CPU 103 a pulse signal composed of a shaped version of the voltage waveform. In response to the pulse signal, the CPU 103 outputs a pace signal to the amplifier 106, and hence the speaker 107 generates a signal sound accordingly. As shown in FIG. 5, the runner starts to run a course X of a distance x to the signal sound. When the runner ends running the course X, he again depresses the fifth key switch S'5 to stop the stopwatch function and the number of steps detecting function. Thus, data on the total number of steps taken in the first test run through the course X counted by the counter 114 is sent to the CPU 103 and stored in the first test run number-of-steps PE1 area 105*n* of the RAM 105. Data on the test run time stored in the time register T'0 is stored in the first test run time T'1 area 105*f* of the RAM 105. The CPU 103 calculates a pace in the first test run on the basis of those data items and stores data on the calculated pace in a first test run pace P'1 area 105*e* of the RAM 105.

Assume now that, for example, the detected number of steps is 66 and the measured test run time is 20 seconds. Thus, the pace is, for example, 198 steps/minute.

It is important that the runner runs any distance x at a given pace in the first test run. This applies in the second and third test runs. The runner can adjust his pace to a signal sound from the speaker 107, as mentioned above.

By the depression of the third key switch S'3 in the test run mode, the picture is changed from the first test run picture B' of FIG. 10 to the second test run C'. As in the first test run, the number of steps required when the runner runs a course X' of any distance x in the second test run is detected and the time taken for the runner to run the distance x at a fixed pace is measured, and a pace in the second test run is calculated on the basis of the detected number of steps and the measured test run time, as in the first run (step D4).

Data on the number of steps detected in the second test run is stored in the second number of steps PE2 area 105*p* of the RAM 105 while data on the test run time is stored in the second test run time T'2 area 105*h* of the RAM 105. The CPU 103 calculates a pace in the second test run on the basis of those data items and stores data on the calculated pace in a second pace P'2 area 105*g* of the RAM 105.

Assume now that the number of steps taken is 92, the test run time taken is 46 seconds and the calculated pace is 120 steps/minute, as the result of the second test run.

The test run distance in the second test run is required to be the same distance x as that in the first test run and the runner preferably makes a second test run in the same course X as in the first test run. The pace set for the second test run is required to be different from the pace in the first test run.

The CPU 103 employs the following as the relation between a pace which the runner had and a test run time taken for the runner to run when the runner runs each of the courses X and X' of a distance x, and calculates a coefficient a' and a constant b' of the relation:

$$P'=a'T'+b'$$

where P' is the pace and T' is the test run time.

The data on the paces and on the test times obtained in the first and second test run are substituted into the pace P' and test run time T' to establish the following simultaneous equations and then calculates the coefficient a' and constant b':

$$198=20a'+b'$$

$$120=46a'+b'.$$

As the result of solution of the simultaneous equations, a'=−3 and b'=258, and the relation is given as $$P'=-3T'+258.$$

The coefficient a' and constant b' of the above relation are stored in the memory areas 105*i* and 105*j*, respectively, of the RAM 105, respectively. This relation is inherent in the runner who made the first and second test runs.

Next, the runner makes a third test run. The first key switch S'1 is depressed to change the picture on the display to a third test run mode timekeeping picture D' of FIG. 10. Under such conditions, the runner depresses the fifth key switch S'5 at the starting and ending points of a course Y of a distance y to start and stop the stopwatch and number-of-steps detecting functions simultaneously to thereby detect and measure the number of steps and test run time, respectively, taken when the runner runs the course Y at a given pace in the third test run, in a manner similar to those in the first and second test runs. A pace in the third test run is then calculated on the basis of the detected number of steps and the measured test run time (step D5).

By depression of the fifth key switch S'5 in the third test run mode timekeeping picture D' of FIG. 10, the measured time is displayed on the display. At this time, the detected number of steps taken is not displayed on the display, but the number of steps is detected simultaneously by depression of the fifth key switch S'5 on the timekeeping picture D'.

The data on the number of steps measured in the third test run is then stored in the third number-of-steps PE3 area 105*q* of the RAM 105 and data on the test run time is stored in the third test run time T'3 area 105*m* of the RAM 105. The CPU 103 calculates a pace in the third test run on the basis of those data items and stores data on the calculated pace in the third test run pace P'3 memory area 105*k* of the RAM 105.

In this case, assume that the number of steps taken is 150, the test run time taken is 50 seconds and the pace is 180 steps/minute as the result of the third test run.

Substituting "180" of the pace into the relation, $$180=-3T'+258.$$

Thus, $$T'=26.$$

The test run time taken for the runner to run the distance x at the pace of 180 steps/minute is 26 seconds, as obtained from the above relation.

The first key switch S'1 is then depressed to change the picture to the real mode target run time setting picture H', and the fourth key switch S'4 is depressed to key in data on a target run time taken for the runner to run a course Y' of the same distance y as that in the third test run (step D6).

Data on the target run time is stored in a target run time T'4 area 105*r* of the RAM 105.

The third key switch S'3 is then depressed to change the picture to the real run mode pace display picture G' and the test run time taken for the runner to run the distance x at the target pace is calculated from the ratio of the third test run time (50 seconds) to the target test run time (60 seconds):

$$60:50=T':26.$$

Thus, $$T'=31.2.$$

Since the test time taken for the runner to run the distance x at the same pace as the runner runs the distance y in the target run time of 60 seconds has been obtained, the test run time is substituted into the above relation to obtain the pace P':

$$P'=-3\times31.2+258=164.4.$$

The pace P' obtained is a one at which the runner runs the distance x and is the same pace at which the runner runs the distance y in the target run time of 60 seconds. Thus, by running the distance y at the same as the pace P', the target run time of 60 seconds is achieved.

Thus, the pace P'=164.4 is a one calculated to run a course Y' of a distance y for which the target run time is set, and is displayed on the pace display picture G' of FIG. 10 (step D7).

In order to obtain the calculated pace, it is necessary that the first and second test run distances are the same and that the third test run distance is the same as the real run distance for which the real target run time is set, but data on the respective course distances is not required to be keyed in.

When the calculated pace is obtained, data on the calculated pace is stored in the calculated pace P'4 area 105s of the RAM 105. The CPU 103 outputs a pace signal indicative of the calculated pace through the amplifier 106 to the speaker 107, which generates a signal sound indicative of a pace of 164 steps/minute at which the runner runs in the target run time of 60 seconds. Thus, the runner is able to run the course Y' to the signal sound to thereby run the course in a time close to the target run time.

Figure 12:
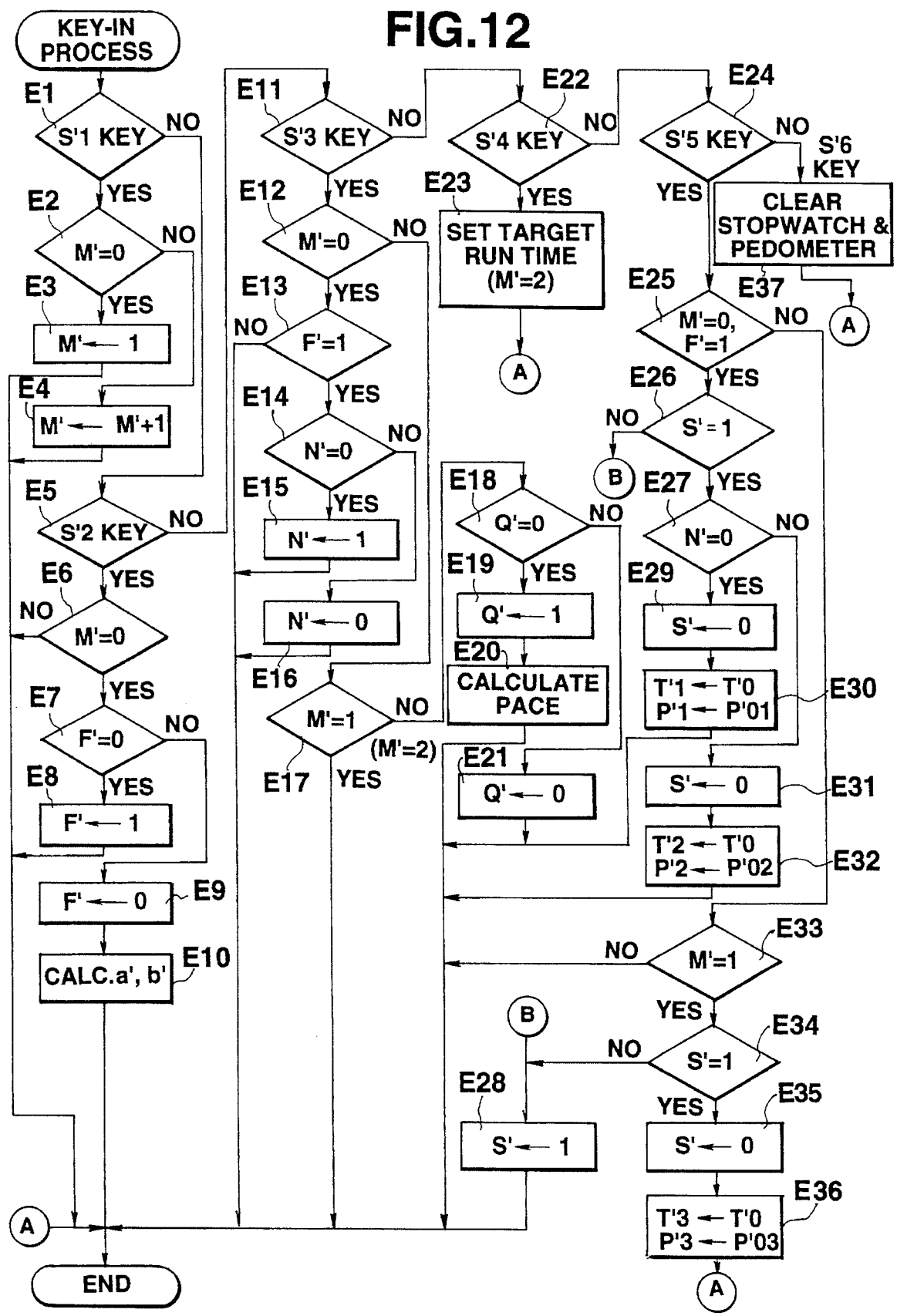
FIG. 12 illustrates a key response process performed in response to the depression of a key in the pace calculation device of the second embodiment.
Figure 13:
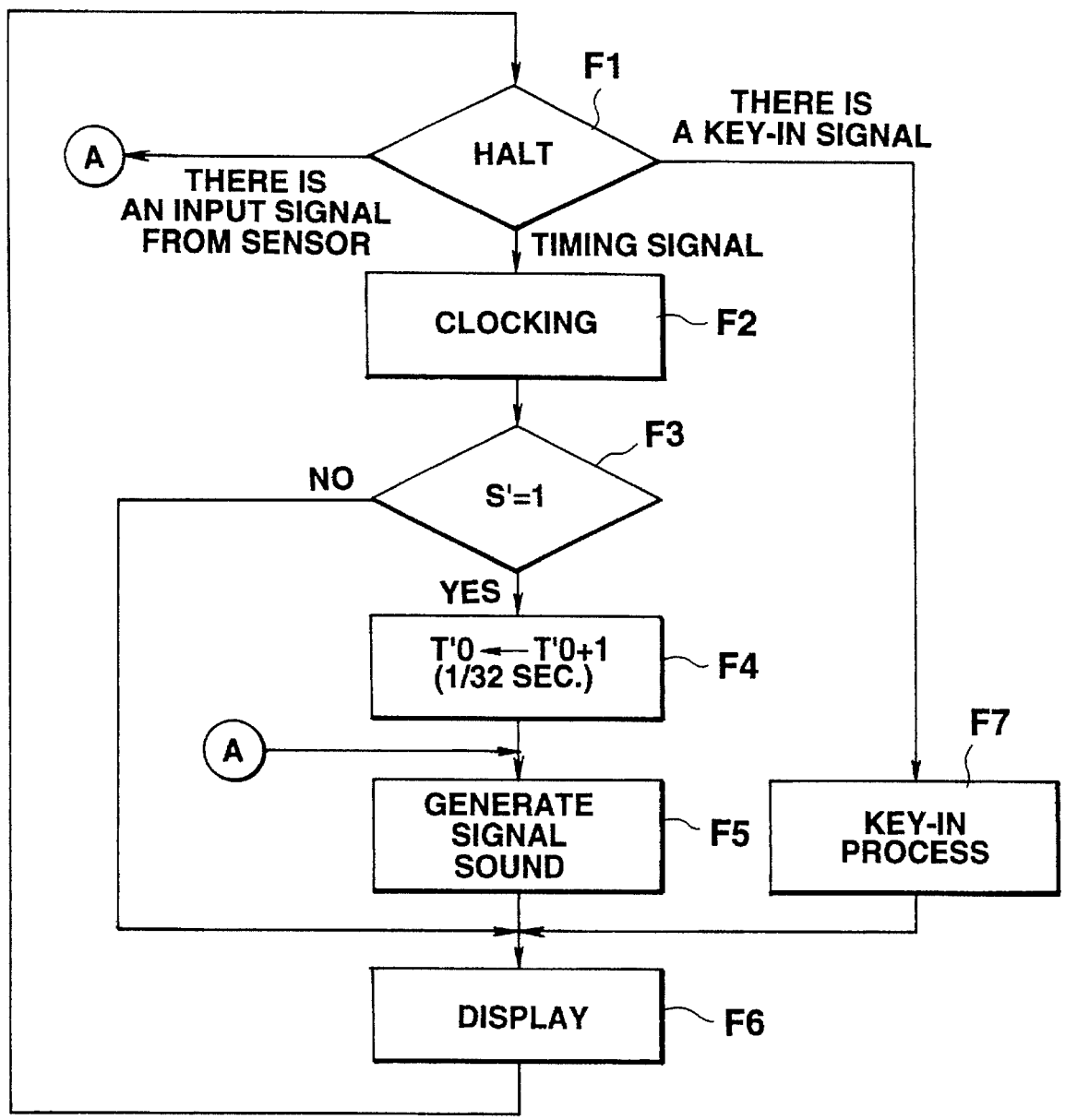
FIG. 13 is a flowchart indicative of an interrupt process performed in response to an interrupt occurring in the pace calculation device of the second embodiment.

A process responsive to the key-in operation at the key-in unit 110, the mode changing operation and the display picture changing operation, performed actually by the CPU 103, will be described with respect to the flowcharts of FIGS. 12 and 13.

First, the flags M', F', N' and Q' which change the modes in response to keyed-in data and the stopwatch and pedometer function flag S' will be described.

The flags M', F', N' and Q' each are also used for changing the picture of the display 109 and will be described with respect to FIG. 10.

The flag M' is used to change the respective clock mode (picture A'); first test run mode (picture B') and second test run mode (picture C'); third test run mode (picture D'); and real run mode (pictures H', G'). The respective modes are assigned 0, 1 and 2 as the value of the flag M'.

The flag F' is used to change the picture from the clock mode (picture A') to the first and second test modes (pictures B', C') and vice versa when the value of the flag M' is 0. In the clock mode, the value of the flag F' is 0; and in the first and second test run modes (pictures B', C'), the value of the flag F'=1.

The flag N' is used to change the picture from one of the first and second test modes (pictures B' and C') to the other and vice versa when the value of the flag M'=0 and the value of the flag F'=1. In the first test run mode (picture B'), N'=0 while in the second test run mode (picture C'), N'=1.

The flag Q' is used to change the picture from the target run time setting picture H' to the pace displaying picture G' and vice versa in the real run mode when the flag M'=2 or in the real run mode (picture H', G'). In the target run time setting picture H', the value of the flag Q'=0 while in the pace displaying picture G', the value of the flag Q'=1.

When each key is depressed, the CPU 103 starts a key response process. First, when the first key switch S'1 is depressed (step E1), the CPU 103 determines whether the value of the flag M' is 0 (step E2). If so, the CPU 103 sets 1 in the flag M' to put the picture of the display 109 and the process of the CPU 103 in the third test run mode (step E3). If the value of the flag M' is other than 0, the CPU 103 adds one to the value of the flag M' to terminate the process (step E4). When the value of the flag M' reaches 3, the value of the flag M' is set at 0.

When the second key switch S'2 is depressed (step E5), the CPU 103 determines whether the value of the flag M' is 0 (step E6). When the value of the flag M' is other than 0, the CPU 103 terminates the process. If the value of the flag M' is 0, the CPU 103 determines whether the value of the flag F' is 0 (step E7). If so, the CPU 103 sets 1 in the flag F' (step E8). If the value of the flag F' is 1, the CPU 103 returns the value of the flag F' to 0 (step E9) and calculates the coefficient a' and constant b' of the relation P'=a'T'+b' by regarding the first and second test runs as completed and hence the two pace data items and test run time data items as obtained (step E10).

When the third key switch S'3 is depressed (step E11), the CPU 103 determines whether the value of the flag M' is 0 (step E12).

If so, the CPU 103 further determines whether the value of the flag F' is 1 (step E13). If not, the CPU 103 terminates the process. If the value of the flag F' is 1, the CPU 103 determines whether the value of the flag N' is 0 (step E14). If so, the CPU 103 sets 1 in the flag N' and puts the picture of the display 109 and the process of the CPU 103 in the second test run mode (step E15). If the value of the flag N' is 1, the CPU 103 sets 0 in the N' and puts the picture of the display 109 and the process of the CPU 103 in the first test run mode (step E16).

If the value of the flag M' is other than 0, the CPU 103 determines whether the value of the flag M' is 1 (step E17). If so, the CPU 103 terminates the process.

If the value of the flag M' is other than 0 or 1, or the value of the flag M' is 2, the picture of the display 109 and process of the CPU 103 are in the real run mode. Thus, the CPU 103 determines whether the value of the flag Q' is 0 (step E18). If so, the CPU 103 determines that the third test run has ended and determines that pace data and test run time data in the third test run have been set or input and that target run time data has been input, sets 1 in the flag Q' to change the picture of the display 109 and the process of the CPU 103 from the target run time setting picture H' to the pace displaying picture G' in the actual run mode (step E19), calculates the pace and displays it on the display 109 (step E20).

If the value of the flag Q' is other than 0, the CPU 103 sets 0 in the flag Q' to change the picture of the display 109 and the process of the CPU 103 from the pace calculating mode to the target run time inputting mode to thereby terminate the process (step E21).

When the fourth key switch S'4 is depressed (step E22), a numerical value for setting a target run time is input when the picture of the display 109 and the process of the CPU 103 are in the real run mode (M'=2) (step E23).

When the fifth key switch S'5 is depressed (step E24), the CPU 103 first determines whether the value of the flag M' is 0 and the value of the flag F' is 1 (step E25). If so, the CPU 103 determines whether the value of the flag S' is 1 (step E26) and then whether the value of the flag N' is 0 (step E27).

When the value of the flag N' is 0, the first test run mode has been employed. Thus, the CPU 103 performs a process in the first test run mode. If the value of the flag S' is other than 1, that is, 0, the stopwatch function has been stopped. Thus, the CPU 103 sets 1 in the flag S' to start the stopwatch function which includes counting up the value of the time register T'0 of the RAM 105 in accordance with a signal from the frequency divider 102 one by one at intervals of 1/32 seconds, and terminates the key response process (step E28).

When the flag S' is 1, the stopwatch function and number-of-steps detecting function have been already operated. Thus, the CPU 103 sets 0 in the flag S' to stop the stopwatch function and the number-of-steps detecting function (step E29), stores data in the time register T'0 as data on a first test run time in the first test run time T'1 area of the RAM 105, stores count data on the number of steps in the counter 114 of the pedometer 111 as data on the number-of-steps in the first test run number-of-steps PE1 area 105n of the RAM 105, calculates a pace P'01 on the basis of those stored data items on the number of steps and test run time, and stores data on the calculated pace P'01 in the first test run pace P'1 area 105e of the RAM 105 and terminates the process (step E30).

When the value of the flag N' is 1, the second test run mode has been employed. Thus, the CPU sets 0 in the flag S' (step E31) and performs a process in a second test run mode similar to that in the first test run mode. The CPU 103 stores data in the time register T'0 as data on a second test run time in the second test run time T'2 area 105h of the RAM 105 and also stores count data on the number of steps in the counter 114 of the pedometer 111 as data on the number-of-steps in the second test run number-of-steps PE2 area 105p of the RAM 105, calculates a pace P'02 on the basis of those stored data items on the number of steps and the test run time, stores it in the second test run pace P'2 area 105g of the RAM 105, and terminates the process (step E32).

When the value of the flag M' is not 0 and the flag F' is not 1 either, the CPU 103 determines whether the value of the flag M' is 1 (step E33). If the value of the flag M' is other than 1 or 0, the CPU 103 terminates the process. When the flag M' is 1, the CPU 103 determines whether the value of the flag S' is 1 (step E34) to perform a process in the third test run mode.

When the value of the flag S' is not 1, the CPU 103 sets 1 in the flag S' to start the stopwatch function and the number-of-steps detecting function (step E28) to measure a test run time and detect the number of steps in the third test run. When the value of the flag S' is 1, the CPU 103 sets 0 in the flag S' to stop the stopwatch function and the number-of-steps detecting function to terminate the measurement of the test run time and the detection of the number of steps in the third test run (step E35). Thus, the CPU 103 stores data on the time register T'0 as data on a third run time in the third test run time T'3 area 105m of the RAM 105, stores count data on the number of steps in the counter 114 of the pedometer 111 as count data on the number of steps in the number-of-steps PE3 area 105q of the RAM 105, calculates a pace P'03 on the basis of those stored data items on the number of steps and test run time and stores it in the third test run pace P'3 area 105k of the RAM 105 and terminates the process (step E36).

When the depressed key is not any of the first-fifth key switches S1'-S5', the sixth key switch S6' has been operated. Thus, the CPU 103 clears the data in the time register T'0 of the RAM 105, and data on the first-third test run numbers of steps PE1-PE3 in the areas 105n-105q, and also clears the data in the counter 114 of the padometer 111 to terminate the process (step E37).

Referring next to the flowchart of FIG. 13, the whole operation of the pace calculation device of this embodiment having the clock function will be described below.

First, when timing signals are input from the divider 102 at intervals of 1/32 seconds to the CPU 103 which is in the halt state (step F1), the CPU 103 performs a clocking process which records the time subsequently in a well-known manner (step F2). The CPU 103 then determines whether the value of the flag S' indicative of the start/stop of the stopwatch function is 1 (step F3). If so, or when the stopwatch function is in operation, the CPU 103 counts up the value of the time register T'0 by one in response to a signal generated from the frequency divider 102 at an interval of 1/32 seconds (step F4).

A sounding process for generation of a signal sound (step F5) starts. In this process, a signal sound is generated in each of the first-third test runs and the real run. Each time a period of time indicative of the pace calculated in the real run mode has passed in the real run, the CPU 103 outputs a pace signal to the amplifier 106 and the speaker 107 generates a corresponding signal sound. In the first-third test runs, a pulse signal based on a detection signal from the acceleration sensor 112 of the pedometer 111 is input to the CPU 103 and hence the speaker 107 outputs a signal sound correspondingly.

A numerical value changed due to a lapse of time or the operation of the stopwatch function is displayed on the display 109 (step F6).

When a signal from the key-in unit 10 is input to the CPU 103 which is in the halt state (step F1), the CPU 103 performs the key response operation as an interrupt process and displays the corresponding mode on the display 109 (step F7).

Thus, according to the pace calculation device of the second embodiment, a pace corresponding to a target run time is easily calculated even for a course whose distance is unknown, as in the first embodiment. Once a pace-target time relation inherent in the runner is obtained, a pace is easily calculated which corresponds to a target run time for each of a plurality of courses each having a different distance.

Since no data on the distance of a course and a runner step is required to be set, the device is easily used anywhere to calculate an accurate pace.

According to the pace calculation device of the second embodiment, the number of runner steps is detected by the pedometer in each of the first-third test runs, and a pace in each of the first-third test runs is calculated on the basis of the detected number of steps in that test run. Thus, pace data is not required to be keyed in as is in the pace calculation device of the first embodiment. Target run time data is only required to be keyed in, so that the data key-in operation is simpler. Thus, the pace calculation device of the second embodiment is easier to use than in the pace calculation device of the first embodiment.

The pace calculation devices according to the present invention are usable not only in the case of the running for which the embodiments have been illustrated, but also in the case of walking and jogging.

What is claimed is:

1. A pace calculation device comprising:

first storage means for storing data on a plurality of different paces at each of which a person moves through any first distance and data on a like number of different times each taken for the person to move through the first distance at a respective one of the paces;

second storage means for storing data on any pace at which the person moved through any second distance and data on a time taken for the person to move through the second distance;

third storage means for storing data on a target movement time taken for the person to move through the second distance at any pace; and calculating means for calculating a pace at which the person moves through the second distance in the target movement time, based on data on which is stored in said third storage means, on the basis of the data on a plurality of paces and the data on a like number of movement times stored in said first storage means, and the data on the pace and data on the movement time stored in said second storage means.

2. A pace calculation device according to claim 1, wherein the data on the pace includes data on the number of steps per minute.

3. A pace calculation device comprising:

first input means for inputting to the device data on a plurality of different paces at each of which a person moves through any first distance and data on a pace at which the person moves through any second distance;

second inputting means for inputting to the device data on a target movement time in which the person moves through the second distance at any pace;

timekeeping means for measuring movement times taken for the person to move through the first and second distances on the basis of the data on the respective paces inputted by said first inputting means to provide data on the movement times;

storage means for storing the data on a plurality of paces inputted by said first inputting means, the data on a target movement time inputted by said second inputting means the data on the movement times provided by said timekeeping means;

calculating means for drawing a relation between a pace and a movement time on the basis of the data on the movement times and the data on the paces for the movement of the person through the first distance, and calculating from the relation a pace at which the person moves through the second distance in the target movement time, based on data on which is inputted by said second input means; and sounding means for generating a signal sound corresponding to the pace calculated by said calculating means.

4. A pace calculation device according to claim 3, wherein said calculating means obtains a relation inherent in the person on the basis of data on at least two movement times each taken for the person to move through the first distance and stored in said storage means and data on at least two paces of the person involved in the measurement of the movement times.

5. A pace calculation device according to claim 3 or 4, wherein said calculating means calculates a pace required for the person to move through the second distance in the target movement time, data on which is stored in said storage means, on the basis of the relation and data on the time movement and data on the pace for movement of the person through the second distance stored in said storage means.

6. A pace calculation device according to claim 3 or 4, wherein the movement of the person through each of the first and second distances comprises a run.

7. A pace calculation device according to claim 3 or 4, wherein the data on the pace comprises data on the number of steps per minute.

8. A pace calculation device according to claim 3 or 4, wherein said timekeeping means comprises a stopwatch.

9. A pace calculation device according to claim 3 or 4, wherein said sounding means generates a signal sound corresponding to data on the pace calculated by said calculating means and a signal sound corresponding to data on the pace inputted by said first input means.

10. A pace calculation device according to claim 3 or 4, further comprising display means for displaying the value of the pace calculated by said calculating means.

11. A pace calculation device comprising:

pedometer means for detecting the number of steps taken for a person to move through any first distance at each of a plurality of different paces and the number of steps taken for the person to move through any second distance at any pace;

timekeeping means for measuring the times taken for the person to move through the respective first and second distances when the respective numbers of steps are detected by said pedometer means;

input means for inputting to device data on a target movement time taken for the person to move through the second distance;

first calculating means for calculating a plurality of paces at each of which the person moved through the first distance and a pace at which the person moved through the second distance on the basis of data on the numbers of steps obtained from said pedometer means and data on the movement times obtained from said timekeeping means;

storage means for storing data on the plurality of paces obtained from said first calculating means, data on the target movement time inputted by said input means, and data on the plurality of movement times obtained from said timekeeping means;

second calculating means for drawing a relation between a pace and a movement time on the basis of data on the plurality of paces and data on the plurality of movement times taken for the person to move through the first distance stored in said storage means, and calculating from the relation a pace at which the person moves through the second distance in the target movement time, based on data on which is input by said second input means; and sounding means for generating a signal sound in correspondence to the pace calculated by said second calculating means.

12. A pace calculation device according to claim 11, wherein said second calculating means obtains a relation inherent in the person on the basis of data on at least two movement times each taken for the person to move through the first distance and stored in said storage means and data on at least two paces of the person involved in the measurement of the movement times.

13. A pace calculation device according to claim 11 or 12, wherein said second calculating means calculates a pace required for the person to move through the second distance in the target movement time, data on which is stored in said storage means, on the basis of the relation and data on the time movement and data on the pace for movement of the person through the second distance stored in said storage means.

14. A pace calculation device according to claim 11 or 12, wherein the movement of the person through each of the first and second distances comprises a run.

15. A pace calculation device according to claim 11 or 12, wherein the data on the pace comprises data on the number of steps per minute.

16. A pace calculation device according to claim 11 or 12, wherein said timekeeping means comprises a stopwatch.

17. A pace calculation device according to claim 11 or 12, wherein said sounding means generates a signal sound corresponding to data on the pace calculated by said second calculating means and a signal sound corresponding to the pace at which the person moves when said pedometer means detects the number of steps taken.

18. A pace calculation device according to claim 11 or 12, further comprising display means for displaying the value of the pace calculated by said second calculating means.

* * * * *